(12) United States Patent
Yamaguchi et al.

(10) Patent No.: US 8,876,206 B2
(45) Date of Patent: Nov. 4, 2014

(54) VEHICLE SEATBACK AND A VEHICLE SEAT PROVIDED WITH A VEHICLE SEATBACK

(75) Inventors: Hiroyoshi Yamaguchi, Yokohama (JP); Makoto Hasegawa, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 364 days.

(21) Appl. No.: 13/070,915

(22) Filed: Mar. 24, 2011

(65) Prior Publication Data

US 2011/0241394 A1 Oct. 6, 2011

(30) Foreign Application Priority Data

Mar. 30, 2010 (JP) ................................. 2010-079472

(51) Int. Cl.
*A47C 7/42* (2006.01)
*B60N 2/64* (2006.01)
*B60N 2/42* (2006.01)
*B60N 2/68* (2006.01)
*B60N 2/72* (2006.01)
*B60N 2/66* (2006.01)
*B60N 2/427* (2006.01)

(52) U.S. Cl.
CPC ................. *B60N 2/686* (2013.01); *B60N 2/643* (2013.01); *B60N 2/4228* (2013.01); *B60N 2/72* (2013.01); *B60N 2/4249* (2013.01); *B60N 2/66* (2013.01); *B60N 2/42745* (2013.01); *B60N 2/682* (2013.01)
USPC ................ 297/230.12; 297/230.13; 297/440.2

(58) Field of Classification Search
USPC .................... 297/230.1–230.14, 284.5, 440.2, 297/452.29, 452.33, 452.34, 452.36
See application file for complete search history.

(56) References Cited

U.S. PATENT DOCUMENTS

| | | | | | |
|---|---|---|---|---|---|
| 375,471 | A | * | 12/1887 | Binder | ...................... 297/230.12 |
| 769,495 | A | * | 9/1904 | Schroeder | .................. 297/230.1 |
| 2,091,063 | A | * | 8/1937 | Ball | .............................. 297/317 |
| 3,348,880 | A | * | 10/1967 | Swann | ...................... 297/228.13 |

(Continued)

FOREIGN PATENT DOCUMENTS

| | | |
|---|---|---|
| JP | U-2-149545 | 12/1990 |
| JP | A-2005-126053 | 5/2005 |

(Continued)

OTHER PUBLICATIONS

Notice of Reasons for Rejection dated Oct. 29, 2013 from Japanese Patent Application No. 2010-079472 (with English-language translation).

*Primary Examiner* — David R Dunn
*Assistant Examiner* — Timothy J Brindley
(74) *Attorney, Agent, or Firm* — Oliff PLC

(57) ABSTRACT

A vehicle seatback including a seatback frame provided with a pair of seatback side frame portions and a seatback upper frame portion that connects together upper end portions of the pair of seatback upper frame portions along the seat width direction, and a support member attached to the seatback frame. The support member is provided with a lower neck bearing portion covering the seatback upper frame portion, and a shoulder bearing portion disposed further towards the front than the seatback upper frame portion in the seat front-rear direction. When a load of a specific value or greater acts on the occupant towards the rear in the seat front-rear direction, the shoulder regions of the occupant are pressed against the shoulder bearing portion, suppressing movement of the occupant towards the rear in the seat front-rear direction.

10 Claims, 16 Drawing Sheets

(56) References Cited

U.S. PATENT DOCUMENTS

| | | | |
|---|---|---|---|
| 4,718,724 A * | 1/1988 | Quinton et al. | 297/284.5 |
| 5,314,235 A * | 5/1994 | Johnson | 297/284.5 |
| 5,344,211 A * | 9/1994 | Adat et al. | 297/230.14 |
| 5,524,971 A * | 6/1996 | Jay et al. | 297/383 |
| 5,551,752 A * | 9/1996 | Lovegrove et al. | 297/284.5 |
| 5,573,302 A * | 11/1996 | Harrison et al. | 297/230.14 |
| 5,722,725 A * | 3/1998 | McNaughton | 297/284.5 |
| 5,803,542 A * | 9/1998 | Insausti | 297/256 |
| 6,257,665 B1 * | 7/2001 | Nagamitsu et al. | 297/285 |
| 6,688,693 B2 * | 2/2004 | Christofferson et al. | 297/354.12 |
| 6,709,060 B1 * | 3/2004 | Su | 297/440.2 |
| 6,817,673 B2 * | 11/2004 | Walker et al. | 297/452.19 |
| 6,959,964 B1 * | 11/2005 | Zapf | 297/230.14 |
| 6,969,114 B2 * | 11/2005 | Keilhauer | 297/230.1 |
| 7,568,765 B2 * | 8/2009 | Brauning | 297/354.1 |
| 7,575,278 B2 | 8/2009 | Wissner et al. | |
| 2003/0047982 A1 * | 3/2003 | Ball et al. | 297/452.29 |
| 2005/0179306 A1 * | 8/2005 | White et al. | 297/452.33 |
| 2008/0150337 A1 * | 6/2008 | Bilak et al. | 297/230.1 |
| 2009/0146475 A1 * | 6/2009 | Rutty | 297/230.1 |
| 2011/0241403 A1 * | 10/2011 | Yamaguchi et al. | 297/452.31 |

FOREIGN PATENT DOCUMENTS

| | | |
|---|---|---|
| JP | A-2007-91175 | 4/2007 |
| JP | A-2007-186103 | 7/2007 |
| JP | A-2009-101137 | 5/2009 |

* cited by examiner

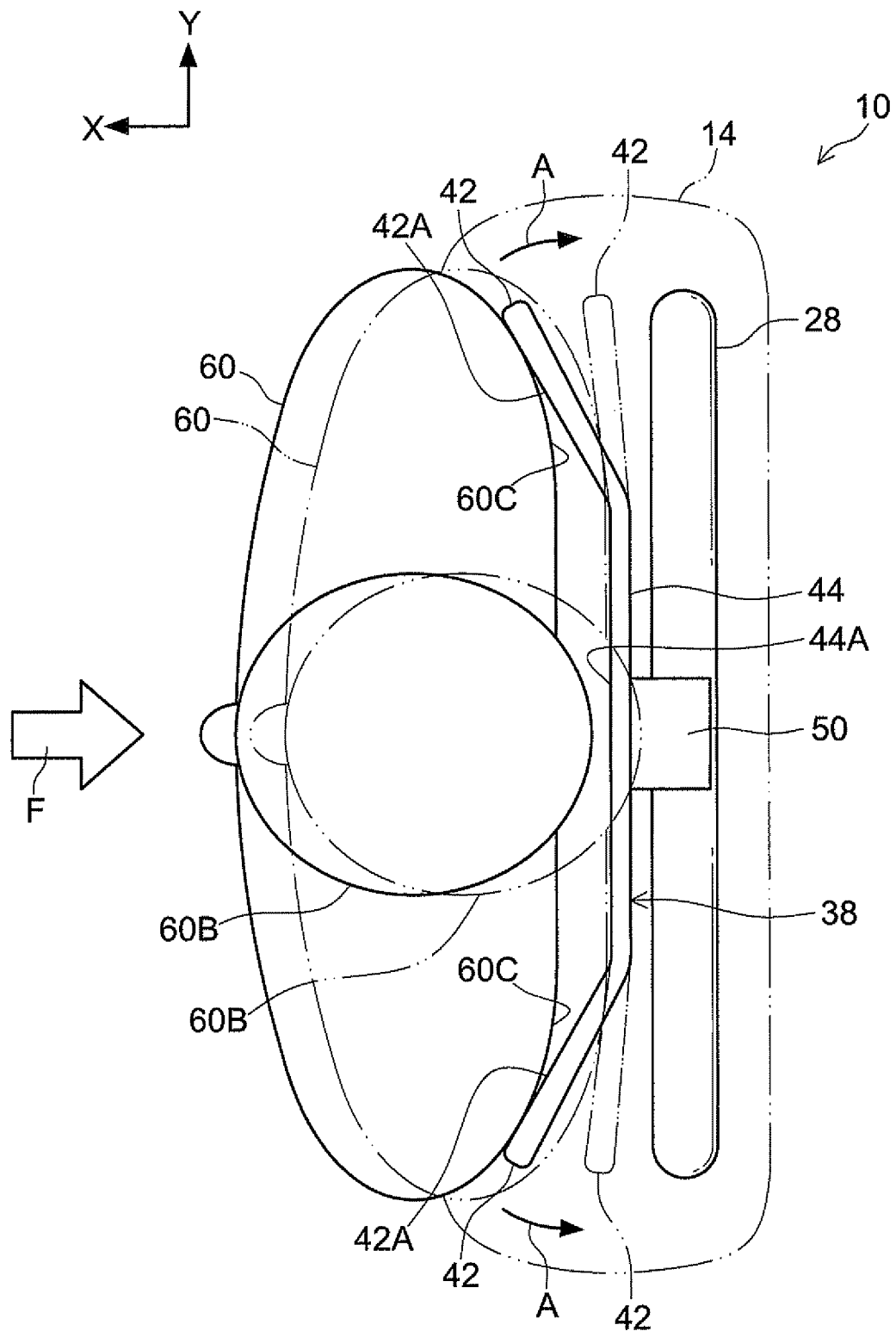

VEHICLE SEATBACK AND A VEHICLE SEAT PROVIDED WITH A VEHICLE SEATBACK

CROSS-REFERENCE TO RELATED APPLICATION

This application claims priority under 35 USC 119 from Japanese Patent Application No. 2010-079472, filed on Mar. 30, 2010, the disclosure of which is incorporated by reference herein.

BACKGROUND OF THE INVENTION

1. Field of the Invention

The present invention relates to a vehicle seatback and to a vehicle seat provided with a vehicle seatback.

2. Description of the Related Art

As a seatback for a vehicle seat, a known seatback is provided with a seatback frame, and a plate body attached to the seatback frame for supporting the back of an occupant seated in the vehicle seat (for example Japanese Patent Application Laid-Open (JP-A) No, 2009-101137). The plate body described in JP-A No. 2009-101137 is formed with an opening extending along the seatback height direction. The opening is formed in a position corresponding to the thoracic vertebrae of an occupant seated in the vehicle seat. Due to the opening, reaction force acting on the thoracic vertebrae of the occupant is reduced when the back of the occupant is pressed against the plate body, thereby improving seating comfort of the occupant.

However, with the seatback described in JP-A No. 2009-101137, when, for example, there is a collision from the vehicle rear by another vehicle or the like (rear impact) and a load of a specific value or greater acts on the occupant due to inertia, the lower neck region of the occupant (cervical vertebrae) are pressed against the seatback upper frame portion of the seatback provided above the plate body. Since generally the seatback upper frame portion here is configured from steel tubing, such as a pipe or the like, reaction force acting on the lower neck region of the occupant is concentrated, increasing strain on the lower neck region.

SUMMARY OF THE INVENTION

The present invention is made in consideration of the above circumstances and provides a vehicle seatback that decreases strain to the lower neck region, and to a vehicle seat provided with such a vehicle seatback.

A vehicle seatback of a first aspect of the present invention includes: a seatback frame including a pair of seatback side frame portions disposed at either side in a seat width direction and extending in a seat height direction, and a seatback upper frame portion that connects together upper end portions of the pair of seatback side frame portions along the seat width direction and that is attachable with a headrest; a support member attached to the seatback frame; and a shoulder bearing portion provided to the support member, disposed further towards a seat front-rear direction front than the seatback upper frame portion, the shoulder bearing portion supporting a shoulder region of an occupant when a load of a specific value or greater acts on the occupant towards the rear in the seat front-rear direction.

According to the first aspect of the present invention, during a rear impact, the occupant is pressed against the support member when load of the specific value or greater acts on the occupant towards the rear in the seat front-rear direction. The support member here is provided with the shoulder bearing portions disposed further towards the front than the seatback upper frame portion in the seat front-rear direction. Accordingly, the shoulder regions of the occupant are pressed against the shoulder bearing portions prior to the lower neck region and the like of the occupant being pressed against the seatback upper frame portion. Movement of the occupant towards the rear in the seat front-rear direction is thereby suppressed, reducing pressing force to the lower neck region of the occupant from the seatback upper frame portion. Consequently, strain to the lower neck region of the occupant is reduced.

A vehicle seatback according to a second aspect of the present invention is the vehicle seatback according to the first aspect, further including: a lower neck bearing portion, provided to the support member, disposed further towards the front in the seat front-rear direction than the seatback upper frame portion and further towards the rear in the seat front-rear direction than the shoulder bearing portion, for supporting the lower neck region of the occupant when a load of the specific value or greater acts on the occupant.

According to the second aspect of the present invention, during a rear impact, when load of the specific value or greater acts on the occupant towards the rear in the seat front-rear direction, the shoulder regions of the occupant are pressed against the shoulder bearing portions provided to the support member, suppressing movement of the occupant towards the rear in the seat front-rear direction. Subsequently, when the lower neck region of the occupant moves further towards the rear in the seat front-rear direction, the lower neck region is pressed against the lower neck bearing portion disposed further to the front than the seatback upper frame portion in the seat front-rear direction. Consequently, for example, the lower neck bearing portion makes face contact with the lower neck region of the occupant, and due to increasing the contact surface area with the lower neck region of the occupant, load acting on the occupant is distributed and transmitted from the lower neck region to the lower neck bearing portion, reducing surface pressure. Pressing force acting as a reaction force on the lower neck region of the occupant (referred to below as "reaction pressing force") is thereby reduced. Consequently, strain to the lower neck region of the occupant is reduced.

A vehicle seatback according to a third aspect of the present invention includes: a seatback frame including a pair of seatback side frame portions disposed at either side in a seat width direction and extending in a seat height direction, and a seatback upper frame portion that connects together upper end portions of the pair of seatback side frame portions along the seat width direction and is attachable with a headrest; a support member attached to the seatback frame; and a lower neck bearing portion provided to the support member, disposed further towards the seat front-rear direction front than the seatback upper frame portion, the lower neck bearing portion supporting a lower neck region of an occupant when a load of a specific value or greater acts on the occupant towards the rear in the seat front-rear direction.

According to the third aspect of the present invention, during a rear impact, when load of the specific value or greater acts on the occupant towards the rear in the seat front-rear direction, the lower neck region of the occupant is pressed against the lower neck bearing portion disposed further to the front than the seatback upper frame portion in the seat front-rear direction. Consequently, for example, the lower neck bearing portion makes face contact with the lower neck region of the occupant, and due to increasing the contact surface area with the lower neck region of the occupant, load acting on the occupant is distributed and transmitted from the lower neck region to the lower neck bearing portion, reducing surface pressure. Pressing force acting on the lower neck region of the occupant is thereby reduced. Consequently, strain to the lower neck region of the occupant is reduced.

A vehicle seatback according to a fourth aspect of the present invention is the vehicle seatback according to the second or the third aspect of the present invention, wherein the lower neck bearing portion is curved so as to form a convex shape pointing towards the front in the seat front-rear direction when viewed from the side.

According to the fourth aspect of the present invention, the lower neck bearing portion is curved so as to form a convex shape pointing towards the front in the seat front-rear direction when viewed from the side. Accordingly, when the lower neck region of the occupant is pressed against the lower neck bearing portion, reaction pressing force is suppressed from concentrating on a particular location of the cervical vertebrae of the occupant. Consequently, strain on the lower neck region of the occupant is reduced.

A vehicle seatback according to a fifth aspect of the present invention is the vehicle seatback according to any one of the second to the fourth aspects of the present invention, wherein a shock absorbing material is provided between the lower neck bearing portion and the seatback upper frame portion.

According to the fifth aspect of the present invention, when the lower neck region of the occupant is pressed against the lower neck bearing portion, the pressing force acting on the lower neck bearing portion (impact force) is absorbed by the shock absorbing material provided between the lower neck bearing portion and the seatback upper frame portion. Accordingly, since the reaction pressing force acting on the lower neck region of the occupant is reduced, the strain on the lower neck region is also reduced.

A vehicle seatback according to a sixth aspect of the present invention is the vehicle seatback according to any one of the second to the fifth aspects of the present invention, wherein a lumbar bearing portion is provided to the support member and curved so as to form a convex shape pointing towards the front in the seat front-rear direction when viewed from the side, for supporting the lumbar region of the occupant when a load of the specific value or greater acts on the occupant.

According to the vehicle seatback of the sixth aspect of the present invention, during a rear impact, when load of the specific value or greater acts on the occupant towards the rear in the seat front-rear direction, the lumbar region of the occupant is pressed against the lumbar bearing portion. The lumbar bearing portion here is curved so as to form a convex shape pointing towards the front in the seat front-rear direction when viewed from the side. Accordingly, reaction pressing force is suppressed from being concentrated on a particular location of the lumbar vertebrae of the occupant, thereby reducing strain on the lumbar region of the occupant. Furthermore, since the lumbar region of the occupant is held (restrained) by the lumbar bearing portion with the lumbar vertebrae in a curved state, deformation of the profile of the lumbar vertebrae is suppressed.

Normally the lumbar vertebrae of a seated occupant here in a vehicle seat are curved, and when the radius of curvature changes and the profile of the lumbar vertebrae is deformed, the position of the head also changes. In particular, when the radius of curvature of the lumbar vertebrae increases, and the profile of the lumbar vertebrae changes to a straight line, the head of the occupant is moved with respect to the headrest, upwards by a large amount in the seat height direction. When the position of the head of the occupant is displaced thus, a mismatch occurs between the timing at which the head of the occupant is pressed against the headrest and the timing at which the lower neck region of the occupant is pressed against the lower neck bearing portion, causing the head of the occupant to swing in the front-rear direction about the lower neck region as the pivot point.

In contrast, in the present exemplary embodiment, as described above, since the lumbar vertebrae of the occupant are held (restrained) by the lumbar bearing portion with the lumbar vertebrae in a curved state, deformation of the profile of the lumbar vertebrae is suppressed. Consequently, by adjusting the relative position of the headrest and the lower neck bearing portion such that any mismatch between timing at which the head of the occupant is pressed against the headrest and the timing at which the lower neck region of the occupant is pressed against the lower neck bearing portion is small, the head of the occupant is suppressed from swinging in the seat front-rear direction with the lower neck region as the pivot point. In particular, by adjusting the relative position of the headrest and the lower neck bearing portion such that the head and the lower neck region of the occupant simultaneously are pressed against the headrest and the lower neck bearing portion, any swinging of the head of the occupant in the seat front-rear direction can be suppressed to a small amount. Consequently, strain to the lower neck region of the occupant is reduced.

A vehicle seatback of a seventh aspect of the present invention is the vehicle seatback according to the sixth aspect of the present invention, further including an indented portion provided to the lumbar bearing portion, indented from the lumbar bearing portion towards the rear in the seat front-rear direction, wherein the lumbar vertebrae of the occupant are disposed in the indented portion when a load of the specific value or greater acts on the occupant.

According to the vehicle seatback of the seventh aspect of the present invention, when a load of a specific value or greater acts on the occupant towards the rear in the seat front-rear direction and the lumbar region of the occupant is pressed against the lumbar bearing portion, the lumbar vertebrae of the occupant are disposed in the indented portion provided to the lumbar bearing portion. Accordingly, since reaction pressing force against the lumbar vertebrae of the occupant is reduced, deformation of the profile of the lumbar vertebrae is suppressed even further, and strain on the lumbar region of the occupant is reduced.

A vehicle seatback of an eighth aspect of the present invention is the vehicle seatback according to the sixth aspect of the present invention, wherein the cross-sectional profile of the lumbar bearing portion is a wave shaped profile when viewed along the seat height direction.

According to the vehicle seatback of the eighth aspect of the present invention, by making the cross-sectional profile of the lumbar bearing portion a wave shaped profile when viewed along the seat height direction, the rigidity of the lumbar bearing portion is made comparatively greater than that of other locations. By increasing the rigidity of the lumbar bearing portion by utilizing the mechanical characteristics of a wave shaped profile, the cost of materials can be reduced in comparison to a configuration in which the thickness of a plate or the like is increased.

A seat according to a ninth aspect of the present invention includes a seat cushion, the vehicle seatback of any one of the first to the eighth aspects of the present invention, attached at a rear edge portion of the cushion in the seat front-rear direction, and a headrest attached to the seatback upper frame portion of the vehicle seatback According to the vehicle seatback of the ninth aspect of the present invention, strain on the lower neck region of the occupant can be reduced by provision of the vehicle seatback of any one of the first to the eighth aspects of the present invention.

As explained above, both the vehicle seatback and the vehicle seat equipped with a vehicle seatback of the present invention exhibit the excellent effect of being able to reduce strain on the lower neck region of the occupant.

BRIEF DESCRIPTION OF THE DRAWINGS

Exemplary embodiments of the present invention will be described in detail based on the following figures, wherein:

FIG. 5 is schematic diagram showing a seated state of an occupant in a vehicle seat according to the first exemplary embodiment of the present invention, as viewed from above in the seat height direction;

DETAILED DESCRIPTION OF THE INVENTION

Explanation now follows regarding a vehicle seat according to an exemplary embodiment of the present invention, with reference to the drawings. Arrow X, arrow Y and arrow Z shown in each of the drawings indicate, respectively, the front side in the seat front-rear direction, the outside in the seat width direction, and the topside in the seat height direction for vehicle seats according to each of the exemplary embodiments.

First explanation follows regarding a configuration of a vehicle seat 10 according to a first exemplary embodiment.

Figure 1:
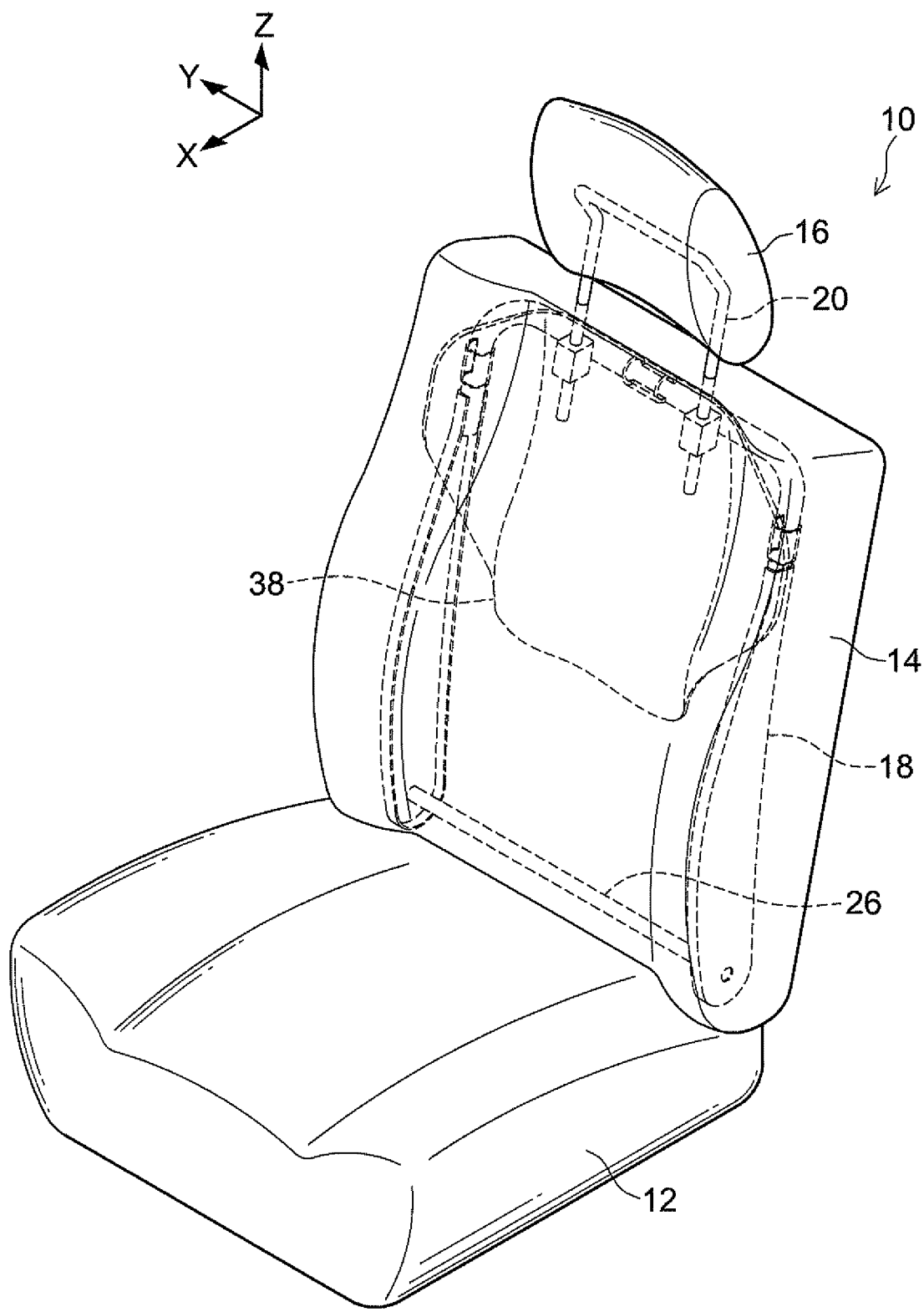
FIG. 1 is a perspective view showing a vehicle seat according to a first exemplary embodiment of the present invention.

The vehicle seat 10 is illustrated in FIG. 1. The vehicle seat 10 is, for example, a seat for application as a front seat in a vehicle or the like. The vehicle seat 10 includes: a seat cushion 12 on which a vehicle occupant sits; a seatback 14, provided so as to be tiltable at a rear edge portion of the seat cushion 12 in the seat front-rear direction for supporting the back of the occupant; and a headrest 16, provided at a top edge portion of the seatback 14 for supporting the head of the occupant.

The seat cushion 12, the seatback 14 and the headrest 16 are respectively equipped with a seat cushion frame (not shown in the drawings), a seatback frame 18 and a headrest frame 20 configuring scaffolds therefor. Each of the seat cushion frame (not shown in the drawings), the seatback frame 18 and the headrest frame 20 supports cushioning material covered by a sheet surface covering, not shown in the drawings.

Figure 2:
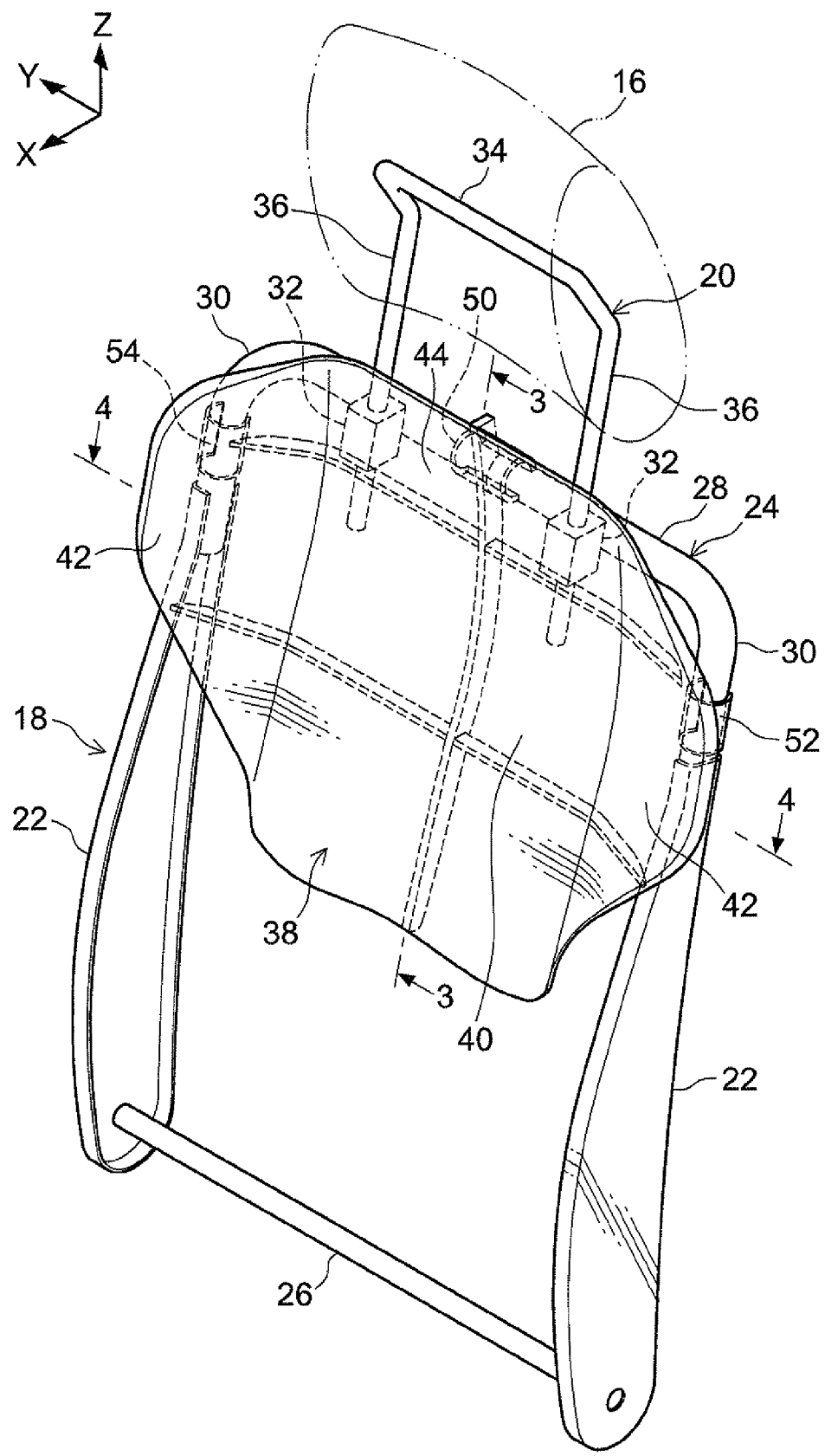
FIG. 2 is a perspective view showing a vehicle seatback according to the first exemplary embodiment of the present invention.

As shown in FIG. 2, the seatback frame 18 configures as a whole a frame shape including: a pair of seatback side frames (seatback side frame portions) 22 disposed at either side in the seat width direction and extending in the seat height direction; a seatback upper frame 24 connecting together top end portions of the seatback side frames 22 along the seat width direction; and a coupling rod (connecting rod) 26 connected to bottom end portions of the seatback side frames 22.

The pair of seatback side frames 22 are C-shaped in cross-section, with the openings of the C-shape opening towards the seat width direction inside, disposed with their length directions along the seat height direction, and configuring side sections of the seatback frame 18. The seatback upper frame 24 is configured by a steel tube bent around in a U-shape and configures the top portion of the seatback frame 18. The seatback upper frame 24 includes a seatback upper frame portion 28 extending along the seat width direction, and side frame upper portions 30 that extend downwards in the seat height direction from end portions at either seat width direction side of the seatback upper frame portion 28 and connected to top end portions of the seatback side frames 22.

A pair of brackets 32 are provided to the seatback upper frame portion 28 for attaching the headrest frame 20. The brackets 32 are tube shaped, spaced apart from each other in the seat width direction, and disposed with their axial directions along the seat height direction. The headrest frame 20 is configured by bending a steel tube into a U-shape, and is provided with a top frame section 34 extending along the seat width direction, and side frame portions (headrest stays) 36 that extend downwards in the seat height direction from end portions at either side in the seat width direction of the top frame section 34. The seat height direction top ends of the side frame portions 36 are inclined forwards in the seat front-rear direction, and end portions at the seat height direction bottom of the side frame portions 36 are inserted into the brackets 32 and coupled to the brackets 32 at a specific position by stopper mechanisms, not shown in the drawings. The position of the headrest 16 is adjustable in the seat height direction by changing the coupling position between the brackets 32 and the side frame portions 36 using the stopper mechanisms.

A support member 38 configured, for example, from sheet steel, a resin sheet or the like, is attached at the seat front-rear direction front side of the seatback frame 18. The support member 38 is disposed at a position facing the back of an occupant seated in the vehicle seat 10 (see FIG. 1), and the back of the occupant is supported by the support member 38 when load of a specific value or greater is applied to the occupant. Note that a flat mat, not shown in the drawings, is provided on the seat front-rear direction front side of the support member 38. Reference here to the occupant corresponds to a person having a standard frame for the country or region in which the vehicle seat 10 according to the present exemplary embodiment is being used.

Figure 3:
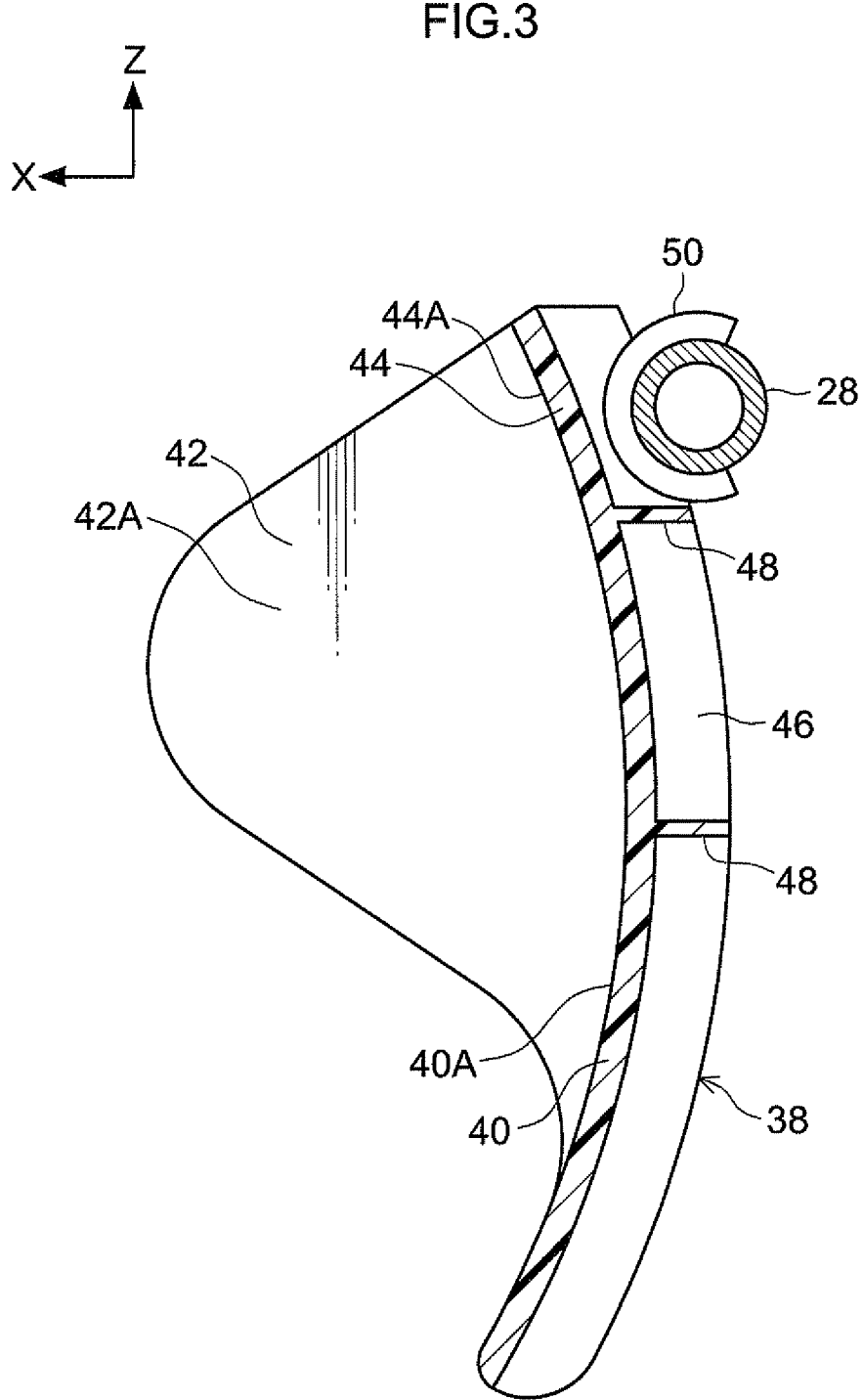
FIG. 3 is a cross-section taken on line 3-3 of FIG. 2.

The support member 38 includes a thorax bearing portion 40, a pair of shoulder bearing portions 42 and a lower neck bearing portion 44. The thorax bearing portion 40, as shown in FIG. 3, is provided at a seat width direction central portion of the support member 38, and the surface of the thorax bearing portion 40 (the surface at the seat front-rear direction front side) configures a pressure receiving surface 40A that supports a region of the occupant from the thoracic vertebrae out to the shoulder blades. The pressure receiving surface 40A is curved conforming to the curved profile of the thoracic vertebrae of the occupant so as to form a convex shape pointing towards the seat front-rear direction rear when viewed from the side. Accordingly, a configuration is achieved in which the thorax of the occupant does not receive concentrated pressing force due to reaction force (referred to below as "reaction pressing force") at a particular location of the thoracic vertebrae when pressed against the pressure receiving surface 40A. Note that the thorax of the occupant corresponds to the thoracic vertebrae of the occupant and regions on both the left and right sides of the thoracic vertebrae.

The lower neck bearing portion 44 is provided above the thorax bearing portion in the seat height direction. The lower neck bearing portion 44 extends from the thorax bearing portion 40 upwards in the seat height direction and covers the seatback upper frame portion 28 (so as to be disposed between the lower neck region of the occupant and the seatback upper frame portion 28). The surface of the lower neck bearing portion 44 (the face on the seat front-rear direction front side) configures a pressure receiving surface 44A for supporting the lower neck region of the occupant. Note that the lower neck region of the occupant corresponds to the cervical vertebrae and a region in the vicinity of the cervical vertebrae.

Figure 4A:
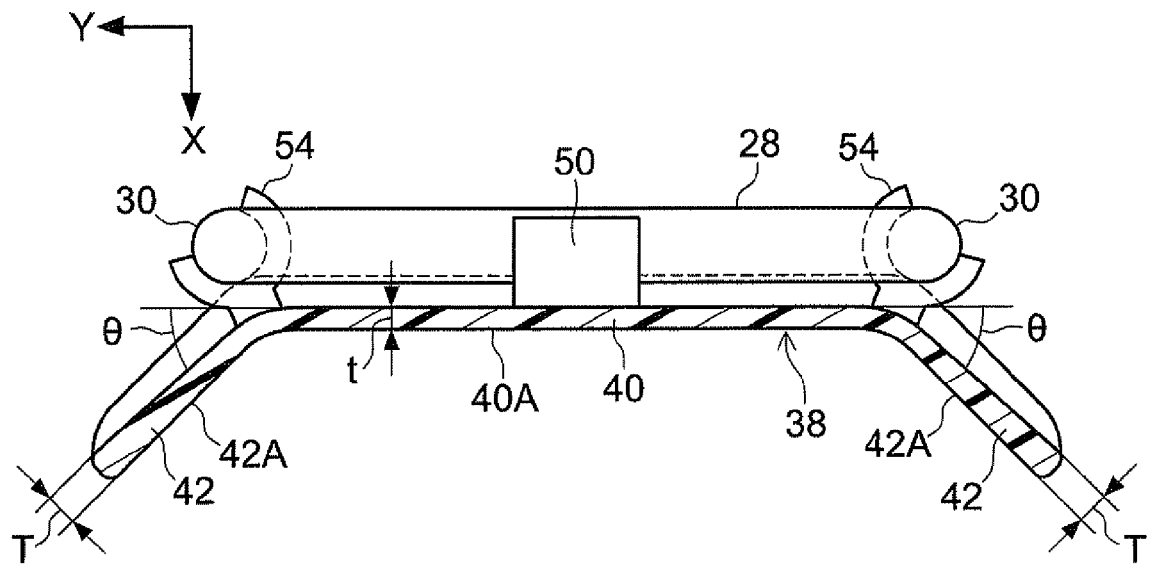
FIG. 4A is a cross-section taken on line 4-4 of FIG. 2.

The shoulder bearing portions 42 are respectively provided at either seat width direction side of the thorax bearing portion 40. The shoulder bearing portions 42, as shown in FIG. 4A, extend towards the seat width direction outside from the thorax bearing portion 40 and are inclined forwards in the seat front-rear direction at a specific angle θ (θ>0°) with respect to the thorax bearing portion 40. The shoulder bearing portions 42 are disposed in front of the seatback upper frame portion 28, the thorax bearing portion 40 and the lower neck bearing portion 44 in the seat front-rear direction. The surface of the shoulder bearing portions 42 (the face on the seat front-rear direction front side) configures a pressure receiving surface 42A for supporting the shoulder regions of the occupant. The thickness T of the shoulder bearing portions 42 is thicker than the thickness t of the thorax bearing portion 40, such that the rigidity of the shoulder bearing portions 42 is greater than the rigidity of the thorax bearing portion 40. Note that the shoulder regions of the occupant correspond to the shoulder blades and to regions in the vicinity of the shoulder blades.

Figure 4B:
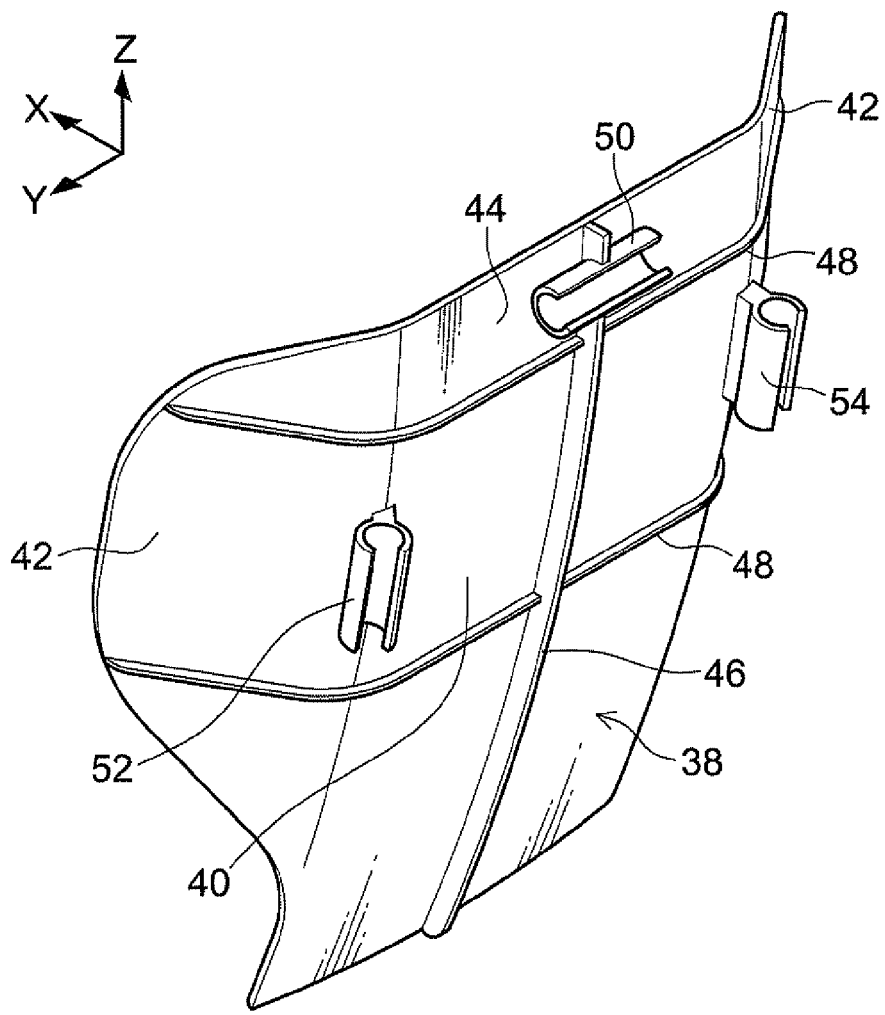
FIG. 4B is a perspective view of a support member according to the first exemplary embodiment of the present invention, as seen from the rear.

The back face (face on the rear side in the seat front-rear direction) of the thus configured support member 38 is, as shown in FIG. 4B, provided with a projecting upright rib 46 extending along the seat height direction, and plural projecting lateral ribs 48 extending along the seat width direction. The upright rib 46 is provided at a seat width direction central portion of the thorax bearing portion 40 and the lower neck bearing portion 44, spanning across between the thorax bearing portion 40 and the lower neck bearing portion 44. The plural lateral ribs 48 are provided spaced out at intervals along the seat height direction, either spanning across between the lower neck bearing portion 44 and the shoulder bearing portions 42, or between the thorax bearing portion 40 and the shoulder bearing portions 42. Seat width direction central portions of the lateral ribs 48 are intersected by the upright rib 46. The rigidity of the support member 38, and in particular the rigidity of the shoulder bearing portions 42, is secured by the presence of the upright rib 46 and the lateral ribs 48. Note that the upright rib 46 and the lateral ribs 48 are provided according to the required rigidity of the support member 38, and either/both may be omitted as appropriate.

Three attachment portions 50, 52, 54 are provided on the back face of the support member 38. The attachment portion 50 is C-shaped in cross-section, and is attached to the back face (face on the rear side in the seat front-rear direction) of the lower neck bearing portion 44 with its axial direction along the seat width direction. The lower neck bearing portion 44 is fixed to the seatback upper frame portion 28 by fitting the attachment portion 50 around the seatback upper frame portion 28. The attachment portions 52, 54 are C-shaped in cross-section, and are attached to the respective back faces of the shoulder bearing portions 42 with their axial directions along the seat height direction. The shoulder bearing portions 42 are fixed to the side frame upper portions 30 by fitting the attachment portions 52, 54 around the side frame upper portions 30.

Note that the attachment structure of the support member 38 to the seatback frame 18 is not limited to the attachment portions 50, 52, 54 as described above. Various known attachment structures (such as, for example, welding, bolting or the like) are applicable as long as it is possible to attach the support member 38 to the seatback frame 18. Moreover, the support member 38 and the seatback frame 18 may be coupled together with a resilient member, such as a tension coil spring or the like.

Explanation now follows regarding operation of the vehicle seat 10 according to the first exemplary embodiment.

FIG. 5 illustrates a seated state of an occupant 60 in the vehicle seat 10, in a schematic diagram as viewed from above along the seat height direction. When, for example, the rear of the vehicle is collided with from behind by another vehicle or the like (rear impact), load acts towards the vehicle rear from force due to the inertia of the occupant 60 seated in the vehicle seat 10, and the occupant 60 moves relatively backwards in the seat front-rear direction. The back of the occupant 60 is thereby pressed against the seatback 14, and the head 60B of the occupant 60 is pressed against the headrest 16 (see FIG. 1).

When a load F acting on the occupant 60 reaches a specific value or greater, the occupant 60 sinks into the seatback 14, and shoulder regions 60C of the occupant 60 are pressed against the support member 38 at the pressure receiving surface 42A of the shoulder bearing portions 42. Then, when the occupant 60 moves further backwards in the seat front-rear direction, the shoulder bearing portions 42 deform backwards in the seat front-rear direction (arrow A direction) about a pivot point of the seat width direction inside edge portions of the shoulder bearing portions 42. The thorax region 60A and the lower neck region (not shown in the drawings) of the occupant 60 are pressed against the pressure receiving surface 40A of the thorax bearing portion 40 (see FIG. 3) and the pressure receiving surface 44A of the lower neck bearing portion 44, respectively.

Accordingly, in the present exemplary embodiment, the shoulder regions 60C of the occupant 60 are pressed against the pressure receiving surface 42A of the shoulder bearing portions 42 prior to the lower neck region of the occupant 60 being pressed against the pressure receiving surface 44A of the lower neck bearing portion 44. Accordingly, movement of the occupant 60 backwards in the seat front-rear direction is restrained, reducing the pressing force of the lower neck region of the occupant 60 against the pressure receiving surface 44A of the lower neck bearing portion 44. The reaction pressing force against the lower neck region of the occupant 60 is reduced as a result. Furthermore, the lower neck region of the occupant 60 is supported by the pressure receiving surface 44A of the lower neck bearing portion 44, and by increasing the contact surface area with the lower neck region of the occupant 60, the load acting on the occupant 60 is distributed and transmitted over the pressure receiving surface 44A, thereby reducing the surface pressure. Accordingly, the reaction pressing force acting on the lower neck region of the occupant 60 is reduced. Consequently, strain to the lower neck region of the occupant 60 is reduced in comparison to cases in which the lower neck region of the occupant is pressed against a seatback upper frame portion, as conventionally (for example in JP-A No. 2009-101137) and the reaction force is concentrated at a particular location of the lower neck region of the occupant.

Similarly to the lower neck region of the occupant 60, the shoulder regions 60C of the occupant 60 are supported by the pressure receiving surface 42A of the shoulder bearing portions 42, and by increasing the contact surface area with the shoulder regions 60C of the occupant 60, load acting on the occupant 60 is distributed and transmitted across the pressure receiving surface 42A, thereby reducing the surface pressure. Since the reaction pressing force acting on the shoulder regions 60C of the occupant 60 is reduced, strain of the shoulder regions 60C of the occupant 60 is reduced.

Furthermore, due to the pressure receiving surface 40A of the thorax bearing portion 40 being curved to correspond to the curved profile of the thoracic vertebrae of the occupant 60, so as to form a convex shape pointing towards the rear in the seat front-rear direction when viewed from the side, reaction pressing force is suppressed from concentrating at a particular region of the thoracic vertebrae of the occupant 60. Accordingly, strain to the thorax region 60A of the occupant 60 is reduced.

Explanation now follows regarding a configuration of a vehicle seat 58 according to a second exemplary embodiment. Similar portions of the configuration to those of the first exemplary embodiment are allocated the same reference numerals and further explanation thereof is omitted.

Figure 6:
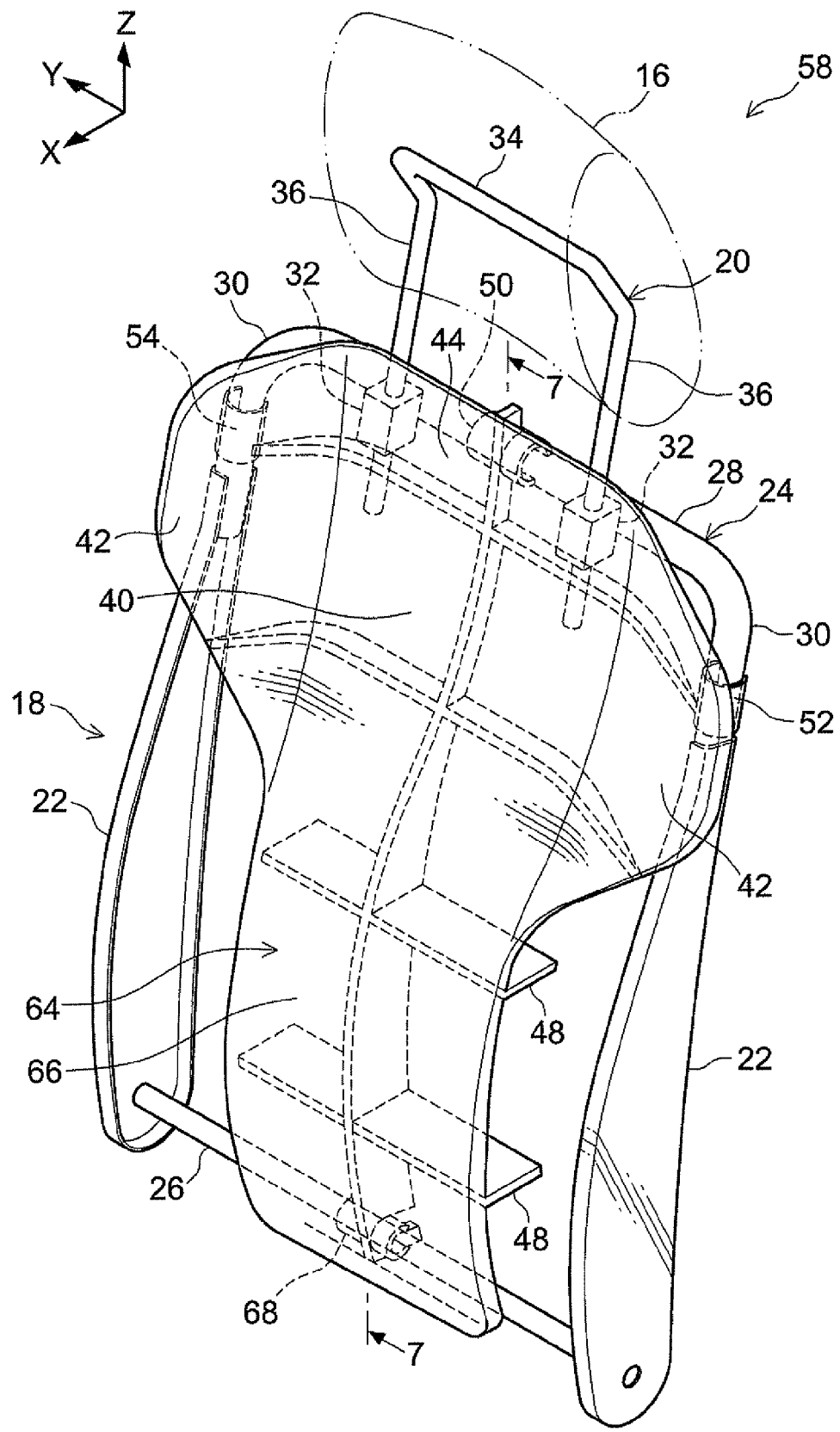
FIG. 6 is a perspective view showing a vehicle seatback according to the second exemplary embodiment of the present invention.
Figure 7:
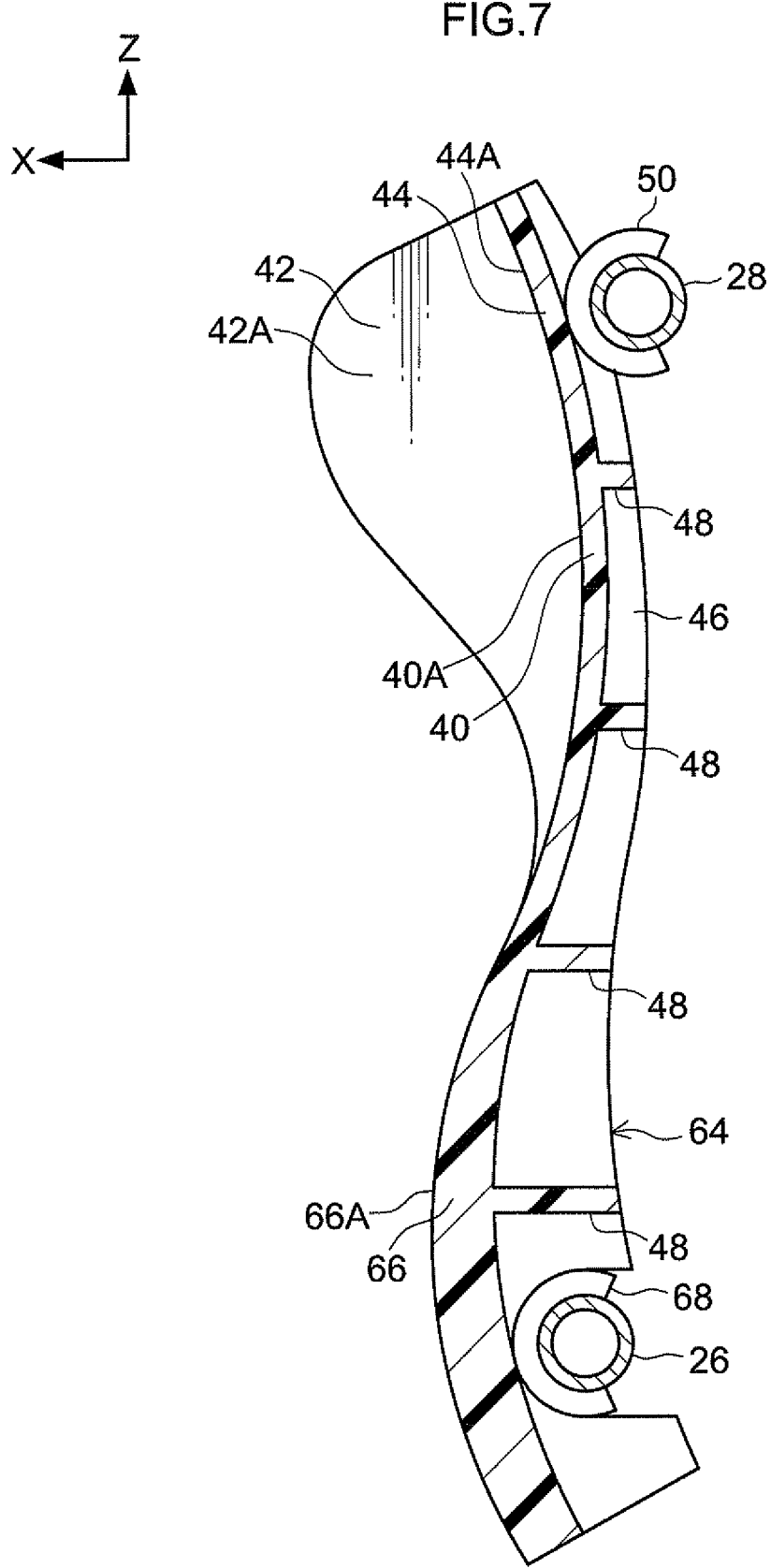
FIG. 7 is a cross-section taken on line 7-7 of FIG. 6.

A seatback frame 18 of the vehicle seat 58 according to the second exemplary embodiment is illustrated in FIG. 6 and FIG. 7. In the second exemplary embodiment, a lumbar bearing portion 66 is provided to a support member 64 attached to the seatback frame 18. The lumbar bearing portion 66 is provided below the thorax bearing portion 40 in the seat height direction, extending downwards in the seat height direction from the thorax bearing portion 40, and the surface of the lumbar bearing portion 66 (the face on the seat front-rear direction front side) configures a pressure receiving surface 66A for supporting the lumbar region of the occupant. The pressure receiving surface 66A is curved conforming to the curved profile of the lumbar vertebrae of the occupant so as to form a convex shape pointing forwards in the seat front-rear direction when viewed from the side. Accordingly, configuration is achieved in which reaction pressing force is not concentrated on a particular region of the lumbar vertebrae when the lumbar region of the occupant is pressed against the pressure receiving surface 66A.

An attachment portion 68 is provided at a location below the lumbar bearing portion 66 in the seat height direction. The attachment portion 68 is C-shaped in cross-section, and is attached to the back face of the lumbar bearing portion 66 (the face on the rear side in the seat front-rear direction) with its axial direction along the seat width direction. The lumbar bearing portion 66 is fixed to the coupling rod 26 by fitting the attachment portion 68 around the coupling rod 26.

Furthermore, as shown in FIG. 7, the lumbar bearing portion 66 is configured thicker than the thorax bearing portion 40, and has greater rigidity than that of the thorax bearing portion 40. An upright rib 46 is provided on the back face of the lumbar bearing portion 66 extending out from the thorax bearing portion 40, and plural lateral ribs 48 are provided thereto extending along the seat width direction. The rigidity of the lumbar bearing portion 66 is secured by provision of the upright rib 46 and the lateral ribs 48.

Explanation now follows regarding operation of the vehicle seat 58 according to the second exemplary embodiment. Note that since operation of the shoulder bearing portions 42 is similar to that of the first exemplary embodiment further explanation thereof is omitted.

Figure 8:
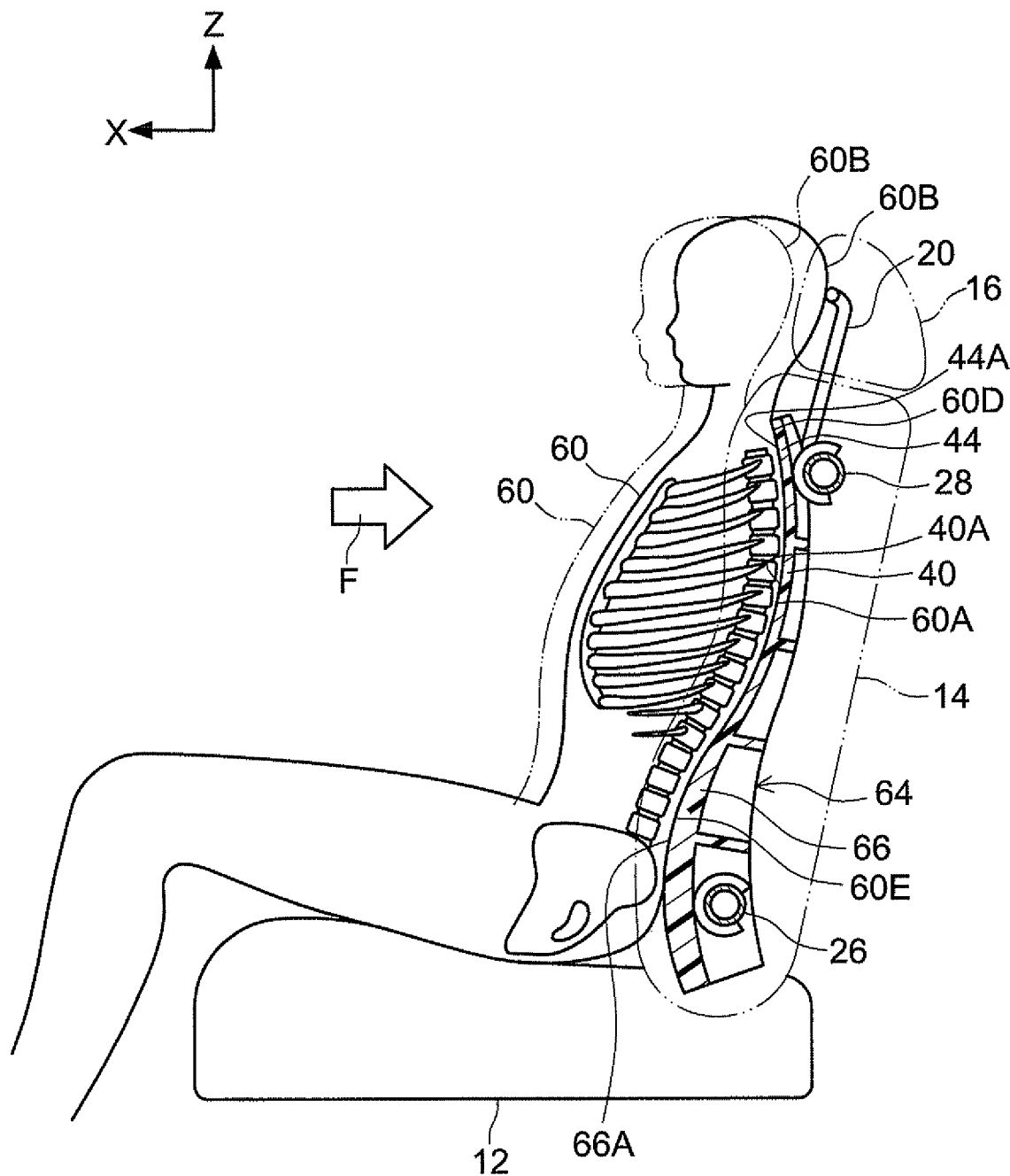
FIG. 8 is a schematic diagram showing a seated state of an occupant in a vehicle seat according to the second exemplary embodiment of the present invention, as viewed from the outside in the seat width direction.

FIG. 8 schematically illustrates a pressed state in which a load F of a specific value or greater acts on the occupant 60, and the head 60B, the thorax region 60A, the lower neck region 60D and the lumbar region 60E are pressed against the headrest 16, the support member 64, the thorax bearing portion 40, the lower neck bearing portion 44, and the lumbar bearing portion 66, respectively. The cervical vertebrae of the occupant are omitted from illustration in FIG. 8.

When, for example, the vehicle is collided with from behind by another vehicle or the like (rear impact) and load F of a specific value or greater acts on the occupant 60 towards the vehicle rear, first the lumbar region 60E, which is comparatively more massive than the thorax region 60A of the occupant 60, is pressed against the lumbar bearing portion 66, then the thorax region 60A and the lower neck region 60D are pressed against the thorax bearing portion 40 and the lower neck bearing portion 44.

In the support member 38, the pressure receiving surface 40A of the thorax bearing portion 40 is curved conforming to the curved profile of the thoracic vertebrae of the occupant 60 so as to form a convex shape pointing towards the rear in the seat front-rear direction when viewed from the side, and the pressure receiving surface 66A of the lumbar bearing portion 66 of the support member 38 is curved in a convex shape pointing towards the front in the seat front-rear direction when viewed from the side. Accordingly, since reaction pressing force is suppressed from concentrating at particular regions of the thoracic vertebrae and the lumbar vertebrae of the occupant 60, strain on the thorax region 60A and the lumbar region 60E of the occupant 60 is reduced.

Furthermore, since the thoracic vertebrae and the lumbar vertebrae of the occupant 60 are held (restrained) in a curved state by the thorax bearing portion 40 and the lumbar bearing portion 66, deformation of the profile of the thoracic vertebrae and the lumbar vertebrae is suppressed. Accordingly, positional displacement of the head 60B and the occupant 60 with respect to the headrest 16 is suppressed, and mismatch between the timing at which the head 60B of the occupant 60 is pressed against the headrest 16 and the timing at which the lower neck region 60D of the occupant 60 is pressed against the lower neck bearing portion 44 can be suppressed to a small amount. Hence the head 60B of the occupant is suppressed from swinging in the seat front-rear directions about a pivot point of the lower neck region 60D. Consequently, strain on the lower neck region 60D of the occupant 60 is reduced.

Figure 9:
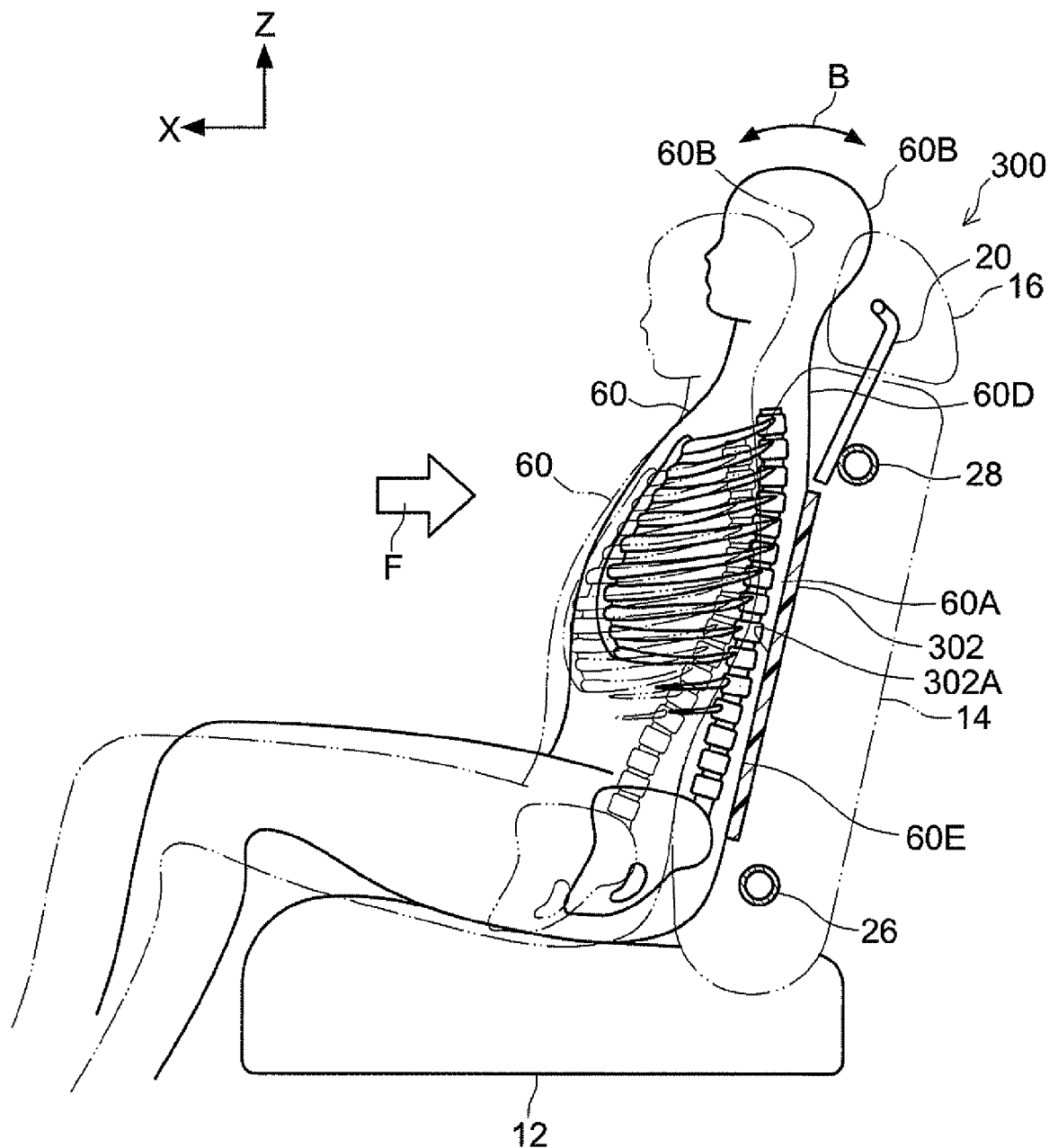
FIG. 9 is a schematic diagram of a seated state of an occupant in a vehicle seat of a comparative example, as seen from the outside in the seat width direction.

A comparison is now made to a vehicle seat 300 in a comparative example shown in FIG. 9. In the vehicle seat 300 a support member 302 is configured with a flat plate, and a pressure receiving surface 302A for supporting the thorax region 60A and the lumbar region 60E of the occupant 60 is configured in a flat plane. Consequently, when the lumbar region 60E of the occupant 60 is pressed against the support member 302, reaction pressing force is concentrated at a particular region of the lumbar vertebrae, deforming the profile of the lumbar vertebrae into a straight line. Furthermore, when the thorax region 60A of the occupant 60 is pressed against the thorax bearing portion 40, reaction pressing force concentrates at a particular region of the thoracic vertebrae, deforming the profile of the thoracic vertebrae into a straight line. The head 60B of the occupant 60 is thereby moved upwards in the seat height direction with respect to the headrest 16 by a large amount. When the position of the head 60B of the occupant 60 is displaced in this manner, a mismatch occurs between the timing at which the head 60B of the occupant 60 is pressed against the headrest 16 and the timing at which the lower neck region 60D of the occupant is pressed against the lower neck bearing portion 44, causing the head 60B of the occupant to swing in the seat front-rear direction (arrow B direction), with the lower neck region as the pivot point.

In contrast thereto, in the present exemplary embodiment, as described above, since the lumbar vertebrae and the thoracic vertebrae of the occupant 60 are held (restrained) in a curved state by the lumbar bearing portion 66 and the thorax bearing portion 40, this suppress deformation of the profile of the lumbar vertebrae and the thoracic vertebrae. Accordingly, by adjusting the relative position between the headrest 16 and the lower neck bearing portion 44 so as to suppress to a small amount any mismatch between the timing at which the head 60B of the occupant 60 is pressed against the headrest 16 and the timing at which the lower neck region 60D of the occupant 60 is pressed against the lower neck bearing portion 44, the head 60B of the occupant 60 is suppressed from swinging in the seat front-rear direction about a pivot point of the lower neck region 60D. In particular, by adjusting the relative position between the headrest 16 and the lower neck bearing portion 44 such that the head 60B and the lower neck region 60D simultaneously are pressed against (are restrained by) the headrest 16 and the lower neck bearing portion 44, respectively, any swinging of the head 60B of the occupant 60 in the seat front-rear direction can be suppressed to a small amount. Consequently, strain on the lower neck region 60D of the occupant 60 is reduced.

In the present exemplary embodiment, the lumbar bearing portion 66 and the thorax bearing portion 40 are curved conforming to the curved profile of the lumbar vertebrae and the thoracic vertebrae of the occupant 60, however, configuration may be made such that at least the lumbar bearing portion 66 is curved conforming to the curved profile of the lumbar vertebrae of the occupant 60 at the first-pressing lumbar region 60E, so as to form a convex shape pointing towards the front in the seat front-rear direction in side view. This is because were the profile of the lumbar vertebrae of the occupant 60 to be deformed, the thorax region 60A of the occupant 60 would be moved upwards in the seat height direction with respect to the thorax bearing portion 40, and since the position where the thorax region 60A is pressed against the thorax bearing portion 40 would change, it would become difficult to maintain the curved state of the lumbar region.

Explanation now follows regarding a modified example of the support member according to the second exemplary embodiment.

Figure 10:
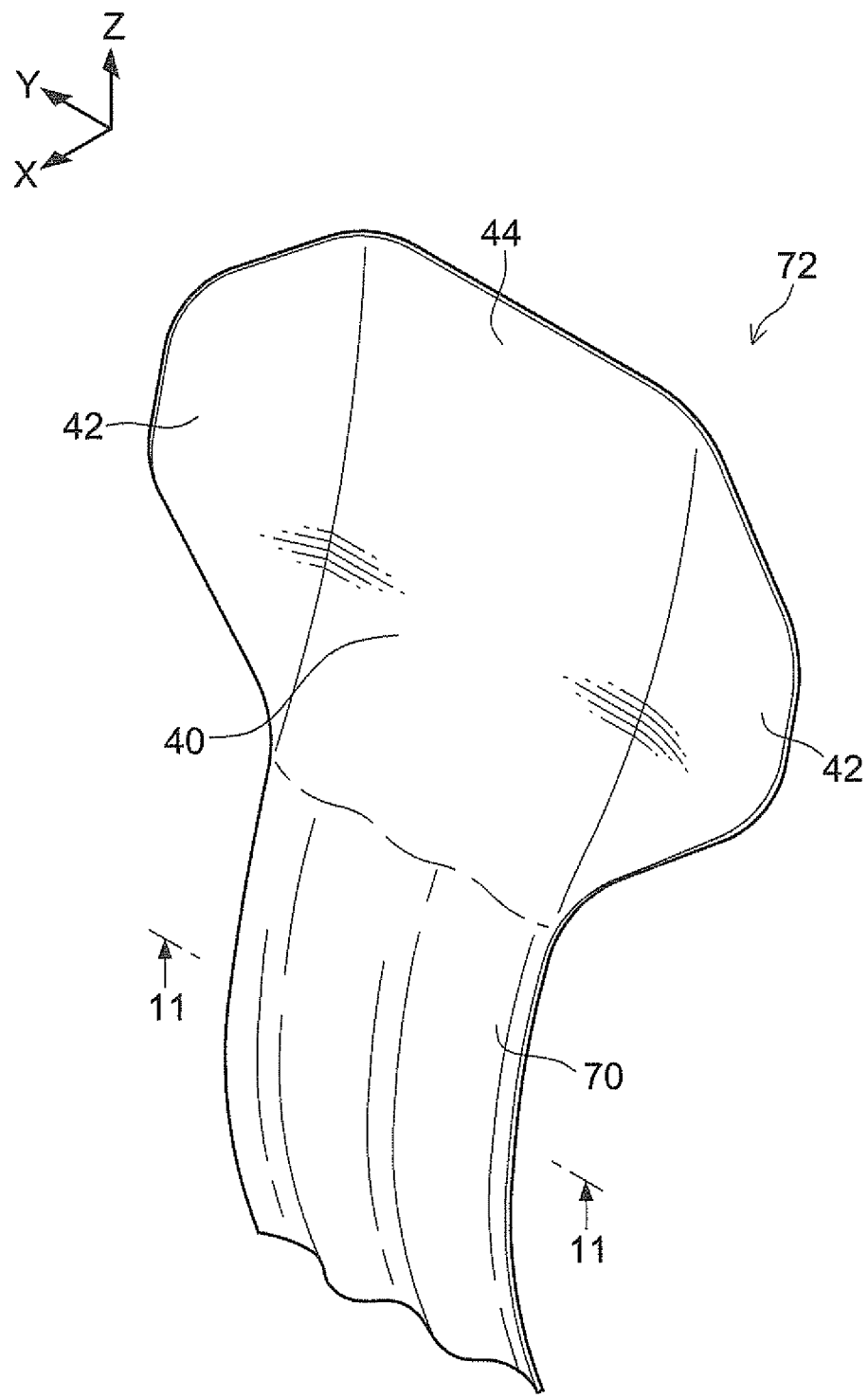
FIG. 10 is a perspective view showing a modified example of a support member according to a second exemplary embodiment of the present invention.
Figure 11:
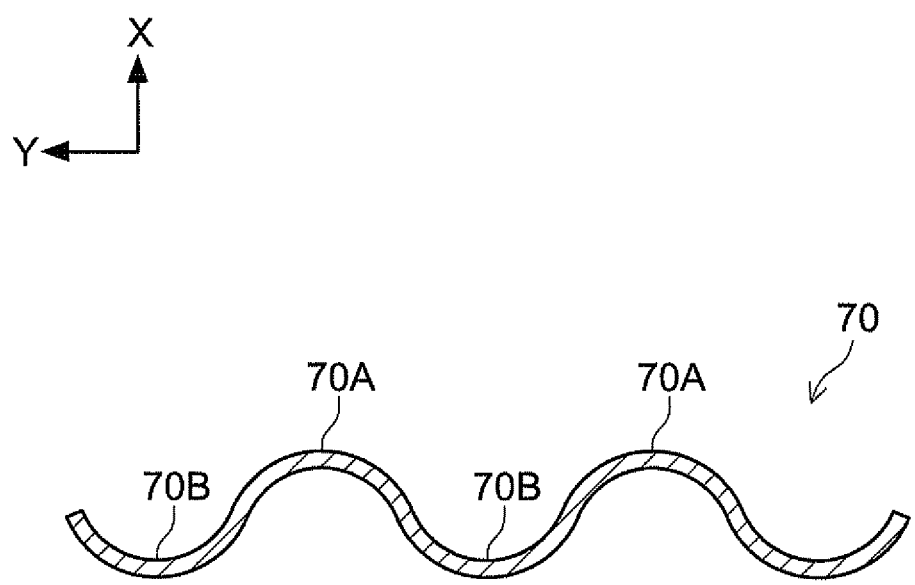
FIG. 11 is a cross-section taken on line 11-11 of FIG. 10.

In order not to impinge the lumbar vertebrae of the occupant, an open portion or an indented portion (concave portion) indented towards the rear in the seat front-rear direction may be provided to the lumbar bearing portion 66. For example, FIG. 10 shows a support member 72 provided to a lumbar bearing portion 70. The lumbar bearing portion 70 is configured by a wave shaped profile sheet member or the like and, as shown in FIG. 11, is provided with plural protruding portions 70A protruding out towards the front in the seat front-rear direction and plural indented portions 70B indented towards the rear in the seat front-rear direction. The protruding portions 70A and the indented portions 70B are disposed alternately along the seat width direction, so as to give the lumbar bearing portion 70 a wave shaped profile in cross-section when viewed along the seat height direction. Configuration is made such that when the lumbar region of the occupant is pressed against the lumbar bearing portion 70, the lumbar vertebrae of the occupant fit inside the indented portion 70B provided at the seat width direction central portion of the lumbar bearing portion 70, so that the lumbar bearing portion 70 does not impinge the lumbar vertebrae of the occupant.

By thus providing the indented portion 70B at the seat width direction central portion of the lumbar bearing portion 70, namely positioned to align with the lumbar vertebrae of the occupant, the reaction pressing force against the lumbar vertebrae of the occupant is reduced, and deformation in the lumbar vertebrae profile is further suppressed. By configuring the lumbar bearing portion 70 with the wave shaped profile, the rigidity of the lumbar bearing portion 70 is also raised above than that of other locations (for example at the thorax bearing portion 40). By thus increasing the rigidity of the lumbar bearing portion 70 by utilizing the mechanical characteristics of a wave shaped profile, the cost of materials can be reduced in comparison to a configuration in which the thickness of a plate or the like of the lumbar bearing portion 70 is increased.

In the configuration shown in FIG. 11, the lumbar bearing portion 70 of the support member 72 is given a wave shaped profile, however the thorax bearing portion 40 may also be given a wave shaped profile. The thorax bearing portion 40 may also be provided with an indented portion indented towards the rear in the seat front-rear direction and open portion, such that the thoracic vertebrae of the occupant are not impinged by the thorax bearing portion 40. Accordingly, deformation in the profile of the thoracic vertebrae can be suppressed.

Furthermore, whereas the shoulder bearing portions 42 (see FIG. 1) are provided to the support member 38 in the above exemplary embodiments, the shoulder bearing portions 42 may be omitted when appropriate. Explanation follows regarding a support member 74 where the shoulder bearing portions 42 are omitted. Explanation will also be given at the same time regarding a modified example of the lower neck bearing portion and regarding a shock absorbing material.

Figure 12:
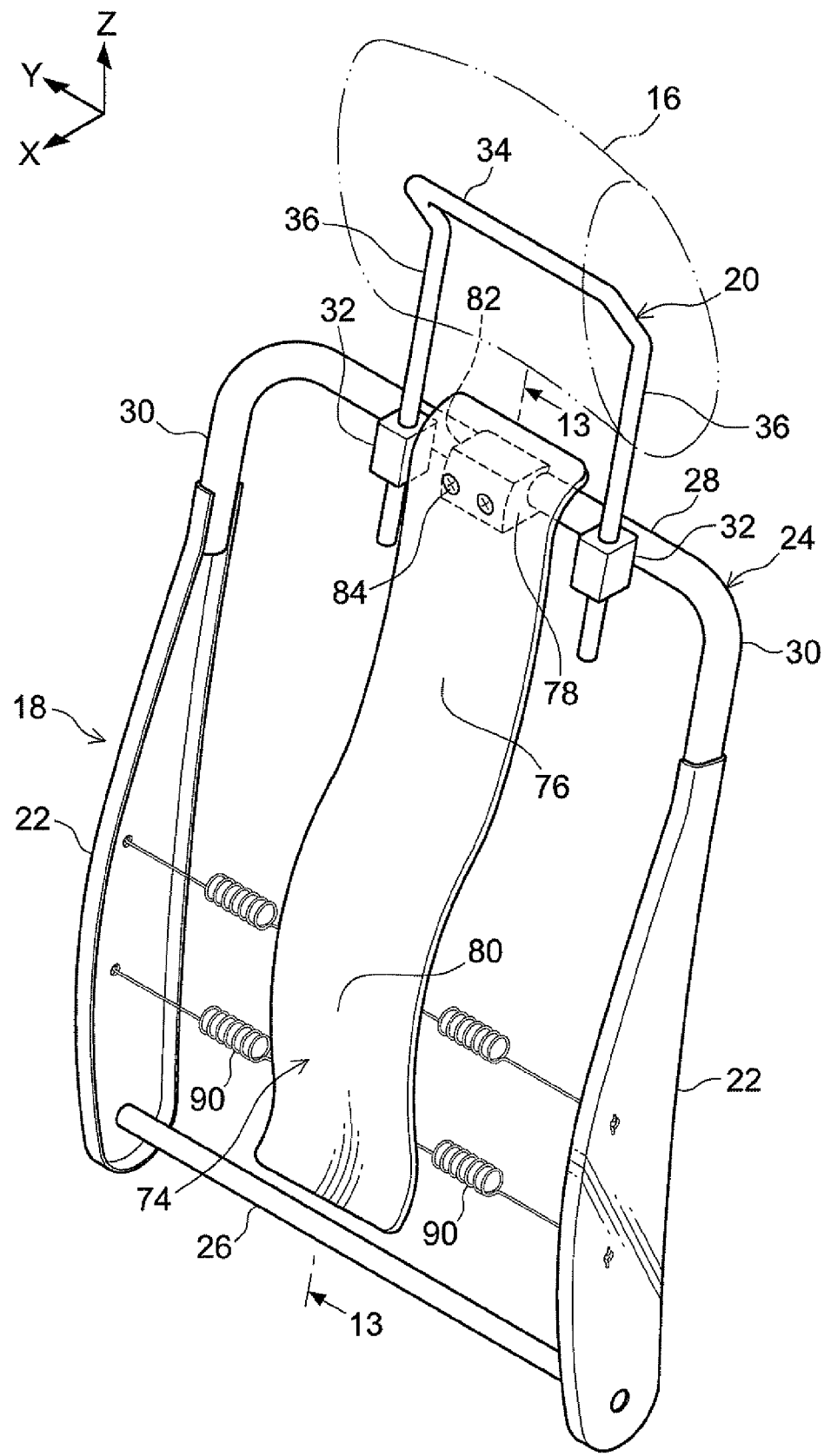
FIG. 12 is a perspective view showing a modified example of a vehicle seatback according to the second exemplary embodiment of the present invention.
Figure 13:
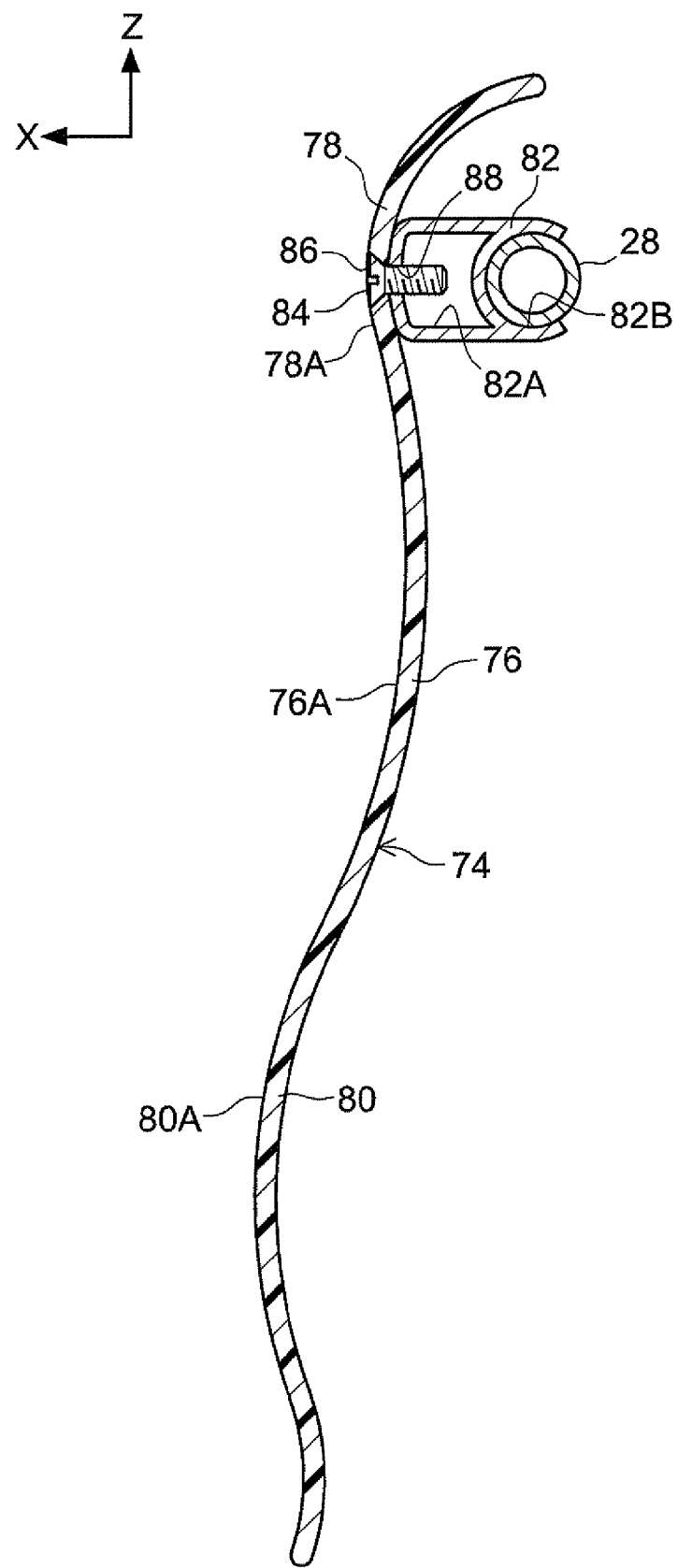
FIG. 13 is a cross-section taken on line 13-13 of FIG. 12.

As shown in FIG. 12 and FIG. 13, the support member 74 includes a thorax bearing portion 76, a lower neck bearing portion 78 provided above the thorax bearing portion 76 in the seat height direction, and a lumbar bearing portion 80 provided below the thorax bearing portion 76 in the seat height direction. The lower neck bearing portion 78 extends upwards from the thorax bearing portion 76 in the seat height direction, and covers a seatback upper frame portion 28. The surface of the lower neck bearing portion 78 (the face at the front side in the seat front-rear direction) configures a pressure receiving surface 78A (see FIG. 13) that supports the lower neck region of the occupant. The pressure receiving surface 78A is curved conforming to the curved profile of the cervical vertebrae of the occupant, so as to form a convex shape pointing towards the front in the seat front-rear direction when viewed from the side. Accordingly, a configuration is achieved in which reaction pressing force is not concentrated on a particular location of the cervical vertebrae when the lower neck region of the occupant is pressed against the pressure receiving surface 78A.

As shown in FIG. 13, an attachment portion 82 is provided as a shock absorbing material to the back face (the face at the rear side in the seat front-rear direction) of a lower neck bearing portion 78. The attachment portion 82 is formed from aluminum, mild steel, or the like, and a hollow portion 82A is provided inside the attachment portion 82. The rigidity of the attachment portion 82 is made small by the presence of the hollow portion 82A, and when load of a specific value or greater acts on the attachment portion 82, the attachment portion 82 collapses, so as to absorb impact energy.

Note that the hollow portion 82A may be filled with low resilience urethane, plastic foam or the like.

The front edge portion of the attachment portion 82 in the seat front-rear direction is formed with threaded holes 88 passing through into the hollow portion 82A. The attachment portion 82 is fixed to the lower neck bearing portion 78 by passing tap screws 84 through through holes 86 formed in the lower neck bearing portion 78 and fastening the tap screws 84 in the threaded holes 88. Note that configuration is made with the heads of the tap screws 84 are housed within countersunk portions formed in the lower neck bearing portion 78, such that the heads of the tap screws 84 do not project out from the pressure receiving surface 78A of the lower neck bearing portion 78.

An open portion 82B of C-shaped cross-section is formed at the seat front-rear direction rear side end of the attachment portion 82. The lower neck bearing portion 78 is fixed to the seatback upper frame portion 28 by fitting the seatback upper frame portion 28 into the open portion 82 13.

Similarly to the pressure receiving surface 78A of the lower neck bearing portion 78, a pressure receiving surface 76A of the thorax bearing portion 76 is curved conforming to the curved profile of the thoracic vertebrae of the occupant, so as to form a convex shape pointing rearwards in the seat front-rear direction as viewed from the side, and an pressure receiving surface 80A of the lumbar bearing portion 80 is curved conforming to the curved profile of the lumbar vertebrae of the occupant, so as to form a convex shape pointing forwards in the seat front-rear direction as viewed from the side. Namely, undulations are applied to the surface of the support member 74 so as to conform to the curved profile of the spine of the occupant (the cervical vertebrae, thoracic vertebrae and lumbar vertebrae). The lumbar bearing portion 80 is coupled to the seatback side frames 22 by tension coil springs (seatback springs) 90 (see FIG. 10) serving as biasing means. The seating comfort is improved by resilient deformation of the tension coil springs 90.

When load of a specific value or greater acts on the occupant, the lower neck region of the occupant is pressed against the lower neck bearing portion 78, however the lower neck region of the occupant is supported by the pressure receiving surface 78A of the lower neck bearing portion 78, and by increasing the contact surface area with the lower neck region of the occupant, the load acting on the occupant is dissipated and transmitted to the pressure receiving surface 78A, such that the surface pressure is reduced. The reaction pressing force acting on the lower neck region of the occupant is thereby reduced. Accordingly, even if the shoulder bearing portions 42 are omitted, strain on the lower neck region of the occupant is reduced in comparison to conventional cases in which the lower neck region of the occupant is pressed against the seatback upper frame portion 28 (such as, for example, JP-A No. 2009-101137). Furthermore, the weight and material cost of the support member 74 can be reduced by omitting the shoulder bearing portions 42.

Furthermore, in the present modified example, by curving the pressure receiving surface 78A of the lower neck bearing portion 78 to conform to the curved profile of the cervical vertebrae of the occupant, so as to form a convex shape pointing towards the front in the seat front-rear direction as viewed from the side, the reaction pressing force is suppressed from being concentrated on a particular location of the cervical vertebrae of the occupant. Accordingly, the strain on the lower neck region of the occupant is reduced.

Moreover, in the present modified example, by the attachment portion 82 being provided as an impact absorbing member between the lower neck bearing portion 78 and the seatback upper frame portion 28, the attachment portion 82 collapses when a load of the specific value or greater acts on the lower neck bearing portion 78, thereby absorbing impact energy. Consequently, stress on the lower neck region of the occupant is reduced even further. Note that configuration may also be made by employing silicone, a viscoelastic body, or a resilient body, such as a spring or the like as the shock absorbing material.

Figure 14:
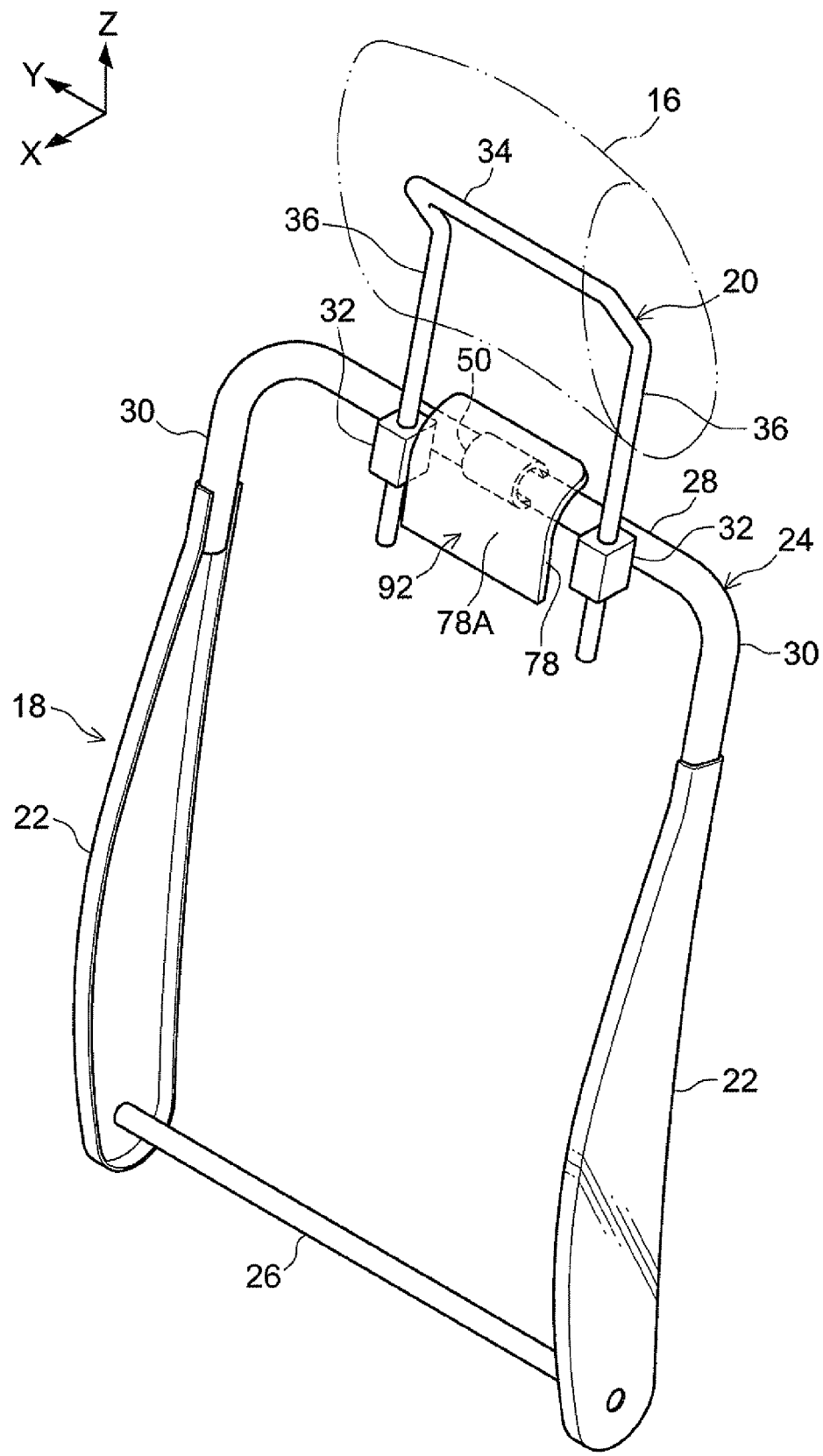
FIG. 14 is a perspective view showing a modified example of the vehicle seatback according to the second exemplary embodiment of the present invention.

In the configurations illustrated in FIG. 12 and FIG. 13, the lower neck bearing portion 78, the thorax bearing portion 76 and the lumbar bearing portion 80 are provided to the support member 74, however either the thorax bearing portion 76 and/or the lumbar bearing portion 80 may be omitted. Specifically, as shown in FIG. 14, configuration may be made with a support member 92 configured with a lower neck bearing portion 78 alone. Note that the lower neck bearing portion 78 is fixed to the seatback frame 18 by an attachment portion 50, provided on the back face of the lower neck bearing portion 78.

Explanation now follows regarding a configuration of a vehicle seat 100 according to a third exemplary embodiment. Note that the similar parts of the configuration to those of the first and second exemplary embodiment are allocated the same reference numerals and further explanation thereof is omitted.

Figure 15:
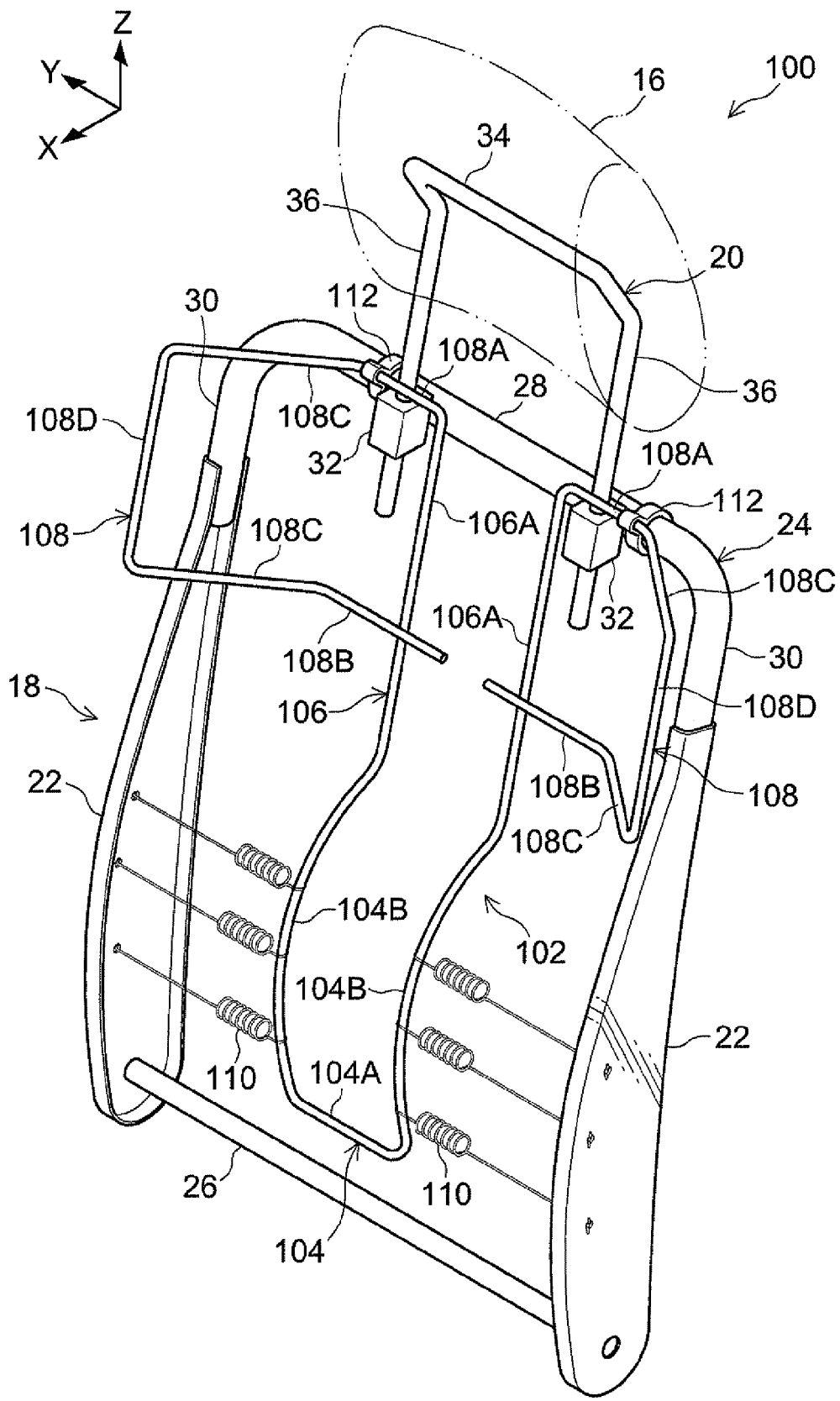
FIG. 15 is a perspective view showing a vehicle seatback according to a third exemplary embodiment of the present invention.
Figure 16:
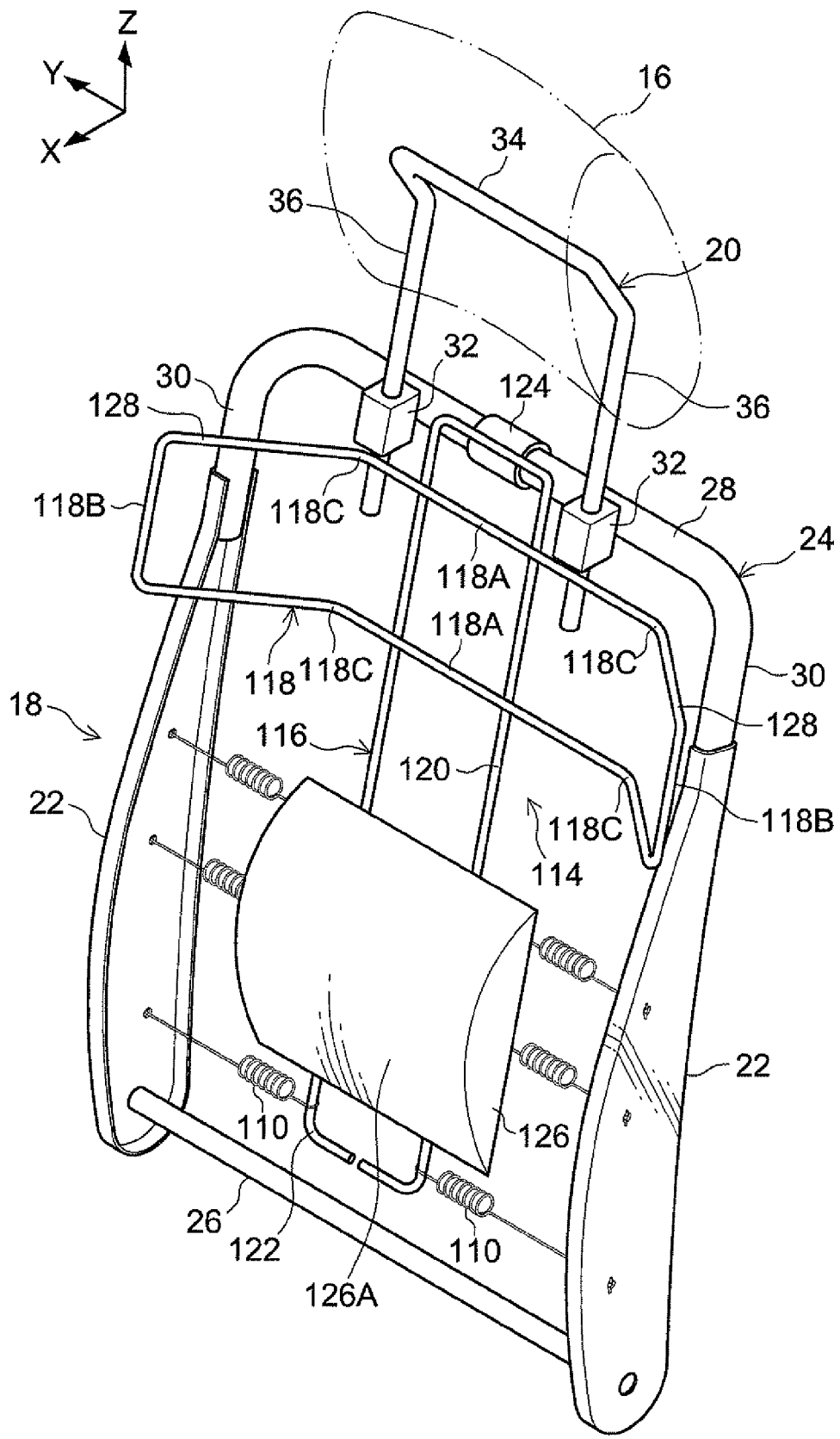
FIG. 16 is a perspective view showing a modified example of a vehicle seatback according to the third exemplary embodiment of the present invention.

FIG. 15 illustrates a seatback frame 18 of the vehicle seat 100 according to the third exemplary embodiment. In the third exemplary embodiment, a support member 102 attached to the seatback frame 18 is configured as a wire frame from bending a single strand wire member, or connecting and combining plural wire members. The support member 102 includes a lumbar bearing frame portion 104 as a lumbar bearing portion, a thorax bearing frame portion 106 as a thorax bearing portion, and shoulder bearing frames 108 as shoulder bearing portions.

The lumbar bearing frame portion 104 is configured by bending a wire member into U-shape, provided with a cross wire member 104A extending along the seat width direction, and a pair of upright wire members 104B extending in the seat height direction upwards from the two seat width direction sides of the cross wire member 104A. The lumbar bearing frame portion 104 is disposed between the seatback side frames 22. The upright wire members 104B are disposed at positions corresponding to respective locations at the left and right sides of the lumbar vertebrae of the occupant, and are pressed against the lumbar region of the occupant when load of a specific value or greater acts on the occupant. Each of the pair of upright wire members 104E is curved conforming to the curved profile of the lumbar vertebrae of the occupant so as to configure a convex shape pointing towards the front in the seat front-rear direction as viewed from the side. Accordingly, deformation of the profile of the lumbar vertebrae is suppressed when the lumbar region of the occupant is pressed against the upright wire members 104B. The pair of upright wire members 104B are also coupled to the seatback side frames 22 by tension coil springs (seatback springs) 110 as biasing means. The seating comfort of the occupant is improved by resilient deformation of the tension coil springs 110.

The thorax bearing frame portion 106 is equipped with a pair of upright wire members 106A that extend upwards in the seat height direction from the seat height direction top side of the upright wire members 104B of the lumbar bearing frame portion 104. The upright wire members 106A are disposed at positions corresponding to locations at the left and right sides of the thoracic vertebrae of the occupant, and are pressed by the thoracic region of the occupant when a load of a specific value or greater acts on the occupant.

The shoulder bearing frames 108 are configured by bending a wire member into a U-shape, and are respectively disposed at positions corresponding to the peripheral edge regions of the shoulder blades of the occupant. The shoulder bearing frames 108 include upper cross wire members 108A extending towards the seat width direction outside from the seat height direction top ends of the upright wire members 106A of the thorax bearing frame portion 106, and lower cross wire members 108B disposed below the upper cross wire members 108A in the seat height direction and extending along the seat width direction so as to cross over the upright wire members 106A of the thorax bearing frame portion 106. Attachment portions 112 of C-shaped cross-section are attached to the upper cross wire members 108A. The support member 102 is fixed to the seatback upper frame portion 28 by fitting the attachment portions 112 around the seatback upper frame portion 28.

Pairs of angled wire members 108C are also provided to the seat width direction outside ends of the upper cross wire members 108A and the lower cross wire members 108B, extending towards the outside in the seat width direction from these ends. These angled wire members 108C are inclined forwards in the seat front-rear direction at a specific angle with respect to the upper cross wire members 108A and the lower cross wire members 108B, and are disposed further forwards in the seat front-rear direction than the seatback upper frame portion 28. The respective seat width direction outside ends of the angled wire members 108C are also connected together by upright wire members 108D extending in the seat height direction.

Accordingly, by thus configuring the support member 102 with a wire frame, a reduction in weight can be achieved, and material costs can also be reduced.

Note that configuration may be made such that panel members are provided to the lumbar bearing frame portion 104, the thorax bearing frame portion 106 and/or the shoulder bearing frames 108 of the support member 102, so as to provide face support at each location of the occupant. Furthermore, for example, a lower neck bearing portion 78 similar to that illustrated in FIG. 14 may also be provided to the support member 102. Furthermore, while the support member 102 is configured by a single wire frame in the configuration shown in FIG. 15, configuration may be made with a support member 114 of a combination of plural wire frames. Specifically, the support member 114 is equipped with two wire frames 116, 118.

The wire frame 116 is configured by bending a wire member into a substantially rectangular loop, and is disposed between the seatback side frames 22 with the rectangular length direction along the seat height direction. The wire frame 116 configures a thoracic bearing frame section 120 at locations at the top side of the wire frame 116 in the seat height direction, and a lumbar bearing frame section 122 at locations at the bottom side of the wire frame 116 in the seat height direction.

An attachment portion 124 of C-shaped cross-section is attached to the top end portion of the thoracic bearing frame section 120 in the seat height direction. The support member 114 is fixed to the seatback upper frame portion 28 by fitting the attachment portion 124 around the seatback upper frame portion 28.

A pressure-receiving member 126 is attached to the front of the lumbar bearing frame section 122 in the seat front-rear direction. The pressure-receiving member 126 has a pressure receiving surface 126A curved conforming to the curved profile of the lumbar vertebrae of the occupant, so as to form a convex shape pointing towards the front in the seat front-rear direction when viewed from the side. Accordingly, a configuration is achieved in which reaction pressing force is not concentrated at a particular location of the lumbar vertebrae when the lumbar region of the occupant is pressed against the pressure receiving surface 126A.

The wire frame 118 is attached, by welding or the like, at locations on the top side of the wire frame 116 in the seat height direction. The wire frame 118 is configured by bending a wire member into a substantially rectangular loop, and includes a pair of cross wire members 118A extending along the seat width direction and a pair of upright wire members 118B extending along the seat height direction, and disposed with their length directions along the seat width direction. The cross wire members 118A are bent at inflection portions 118C provided at outside locations in the seat width direction, and the end portions of the cross wire members 118A at the seat width direction outside are disposed further forward in the seat front-rear direction than the seatback upper frame portion 28. The locations of the wire frame 118 further to the seat width direction outside than the inflection portions 118C configure shoulder bearing frame sections 128 serving as shoulder bearing portions.

Accordingly, by thus configuring the support member 102 from the combination the two wire frames 116, 118, the manufacturing cost of the support member 102 can be reduced due to simplification to the structure of the support member 102.

While explanation has been given of the first to the third exemplary embodiments of the present invention, the present invention is not limited to these exemplary embodiments. Obviously combinations may be employed of elements from the first to the third exemplary embodiment, and various embodiments obtained by implementing within a scope not departing from the spirit of the present invention.

What is claimed is:

1. A vehicle seatback comprising:
a seatback frame comprising a pair of seatback side frame portions disposed at either side in a seat width direction and extending in a seat height direction, and a seatback upper frame portion that connects together upper end portions of the pair of seatback side frame portions along the seat width direction and that is attachable with a headrest; and
a support member attached to the seatback frame;
wherein the pair of seatback side frame portions are respectively disposed at both side end portions, in a seat width direction, of the seat back frame,
wherein the support member includes a shoulder bearing portion attached to upper portions of the seatback side frame portions by means of at least one attachment portion C-shaped in cross-section and fitted around the upper portions of the seatback side frame portions, the shoulder bearing portion being disposed further towards a seat front-rear direction front than the seatback upper frame portion, and the shoulder bearing portion supporting a shoulder region of an occupant when a load of a specific value or greater acts on the occupant towards the rear in the seat front-rear direction, wherein the at least one attachment portion is located behind a back portion of the support member, and wherein the support member includes a lower neck bearing portion attached to the seatback upper frame portion, and disposed further towards the front in the seat front-rear direction than the seatback upper frame portion and further towards the rear in the seat-front rear direction than the shoulder bearing portion, the lower neck bearing portion supporting a lower neck region of the occupant when the load of the specific value or greater acts on the occupant.

2. The vehicle seatback of claim 1, wherein the lower neck bearing portion is curved so as to form a convex shape pointing towards the front in the seat front-rear direction when viewed from the side.

3. The vehicle seatback of claim 1, further comprising a shock absorbing material provided between the lower neck bearing portion and the seatback upper frame portion.

4. The vehicle seatback of claim 1, further comprising a lumbar bearing portion provided to the support member and curved so as to form a convex shape pointing towards the front in the seat front-rear direction when viewed from the side, to support the lumbar region of the occupant when a load of the specific value or greater acts on the occupant.

5. The vehicle seatback of claim 4, further comprising an indented portion provided to the lumbar bearing portion, indented from the lumbar bearing portion towards the rear in the seat front-rear direction, wherein lumbar vertebrae of the occupant are disposed in the indented portion when a load of the specific value or greater acts on the occupant.

6. The vehicle seatback of claim 4, wherein the cross-sectional profile of the lumbar bearing portion is a wave shaped profile when viewed along the seat height direction.

7. A vehicle seat comprising:
a seat cushion;
the vehicle seatback of claim 1, attached at a rear edge portion of the seat cushion in the seat front-rear direction; and
a headrest attached to the seatback upper frame portion of the vehicle seatback.

8. The vehicle seatback of claim 1, wherein the support member is directly attached to the seatback frame.

9. The vehicle seatback of claim 1, wherein the support member extends toward the seat width direction outer sides and beyond the seatback side frame portions from a seat width direction central portion of the support member and is inclined forward in the seat front-rear direction with respect to the seat width direction central portion.

10. A vehicle seatback comprising:

a seatback frame comprising a pair of seatback side frame portions disposed at both side end portions in a seat width direction and extending in a seat height direction, and a seatback upper frame portion that connects together upper end portions of the pair of seatback side frame portions along the seat width direction and that is attachable with a headrest; and a support member attached to the seatback frame at the pair of seatback side frame portions and the seatback upper frame portion, the support member including a shoulder bearing portion disposed further towards a seat front-rear direction front than the seatback upper frame portion, the shoulder bearing portion supporting a shoulder region of an occupant when a load of a specific value or greater acts on the occupant towards the rear in the seat front-rear direction, wherein the shoulder bearing portion extends towards the seat width direction outer sides and beyond the seatback side frame portions from a seat width direction central portion of the support member and is inclined forwards in the seat front-rear direction with respect to the seat width direction central portion, and wherein the shoulder bearing portion is attached to upper portions of the seatback side frame portions by means of at least one attachment portion C-shaped in cross section and fitted around the upper portions of the seatback side frame portions, the at least one attachment portion being located behind a back portion of the support member.

* * * * *